US011182038B2

(12) United States Patent
Van Ostrand et al.

(10) Patent No.: US 11,182,038 B2
(45) Date of Patent: Nov. 23, 2021

(54) ENCODED DATA PATTERN TOUCHSCREEN SENSING SYSTEM

(71) Applicant: SigmaSense, LLC., Wilmington, DE (US)

(72) Inventors: Daniel Keith Van Ostrand, Leander, TX (US); Gerald Dale Morrison, Redmond, WA (US); Richard Stuart Seger, Jr., Belton, TX (US); Timothy W. Markison, Mesa, AZ (US); Patricia Markison Healy, Phoenix, AZ (US)

(73) Assignee: SigmaSense, LLC., Wilmington, DE (US)

( * ) Notice: Subject to any disclaimer, the term of this patent is extended or adjusted under 35 U.S.C. 154(b) by 0 days.

(21) Appl. No.: 16/842,938

(22) Filed: Apr. 8, 2020

(65) Prior Publication Data
US 2021/0318781 A1    Oct. 14, 2021

(51) Int. Cl.
G06F 3/044    (2006.01)
G06F 3/041    (2006.01)

(52) U.S. Cl.
CPC .......... *G06F 3/0446* (2019.05); *G06F 3/0412* (2013.01); *G06F 3/0445* (2019.05); *G06F 3/0448* (2019.05); *G06F 2203/04103* (2013.01)

(58) Field of Classification Search
USPC ................................................ 345/170–178
See application file for complete search history.

(56) References Cited

U.S. PATENT DOCUMENTS 6,168,080 B1 * 1/2001 Verschuur ................ B07C 1/00
                                                   235/451
6,218,972 B1   4/2001 Groshong
(Continued)

FOREIGN PATENT DOCUMENTS

CN    103995626 A    8/2014
CN    104182105 A    12/2014

OTHER PUBLICATIONS

Baker; How delta-sigma ADCs work, Part 1; Analog Applications Journal; Oct. 1, 2011; 6 pgs.
(Continued)

*Primary Examiner* — Tony O Davis
(74) *Attorney, Agent, or Firm* — Garlick & Markison; Timothy W. Markison; Patricia M. Healy

(57) ABSTRACT

An encoded data pattern touchscreen sensing system includes an encoded data pattern including one or more electrical materials arranged in a pattern representative of data. The encoded data pattern touchscreen sensing system further includes an encoded data pattern touchscreen sensing computing device including: a touchscreen, a plurality of electrodes integrated into the touchscreen, and a plurality of drive-sense circuits coupled to the plurality of electrodes, where, when in close proximity to the encoded data pattern, the plurality of drive-sense circuits detect changes in electrical characteristics of the plurality of electrodes caused by the encoded data pattern. The encoded data pattern touchscreen sensing computing device further includes a processing module operably coupled to: receive a set of detected changes in electrical characteristics, interpret the detected changes as a set of impedance values representative of the one or more electrical materials of the encoded data pattern, and interpret the set of impedance values to determine the data.

14 Claims, 30 Drawing Sheets
(10 of 30 Drawing Sheet(s) Filed in Color)

(56) References Cited

U.S. PATENT DOCUMENTS

| | | |
|---|---|---|
| 6,665,013 B1 | 12/2003 | Fossum et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,587,535 B2 | 11/2013 | Oda et al. |
| 8,625,726 B2 | 1/2014 | Kuan et al. |
| 8,982,097 B1 | 3/2015 | Kuzo et al. |
| 9,201,547 B2 | 12/2015 | Elias |
| 10,671,034 B1* | 6/2020 | Gray ................. H02P 23/14 |
| 10,756,578 B1* | 8/2020 | Price ................. H02J 7/025 |
| 2011/0063154 A1 | 3/2011 | Hotelling et al. |
| 2011/0298745 A1 | 12/2011 | Souchkov |
| 2012/0278031 A1 | 11/2012 | Oda |
| 2012/0306813 A1* | 12/2012 | Foerster ............. G06F 3/044 345/174 |
| 2013/0009905 A1* | 1/2013 | Castillo ............. G06F 3/0414 345/174 |
| 2013/0278447 A1 | 10/2013 | Kremin |
| 2014/0184507 A1* | 7/2014 | Yamada ............. G06F 3/03545 345/158 |
| 2014/0192008 A1* | 7/2014 | Teissier ............. G06F 3/0446 345/174 |
| 2014/0327644 A1 | 11/2014 | Mohindra |
| 2015/0054765 A1* | 2/2015 | Kurokawa ........... G06F 3/0412 345/173 |
| 2015/0091847 A1 | 4/2015 | Chang |
| 2015/0138159 A1* | 5/2015 | Kang ................. G06F 3/03542 345/175 |
| 2015/0193028 A1* | 7/2015 | Narita ................. G06F 3/0488 345/173 |
| 2015/0242740 A1* | 8/2015 | Dehouwer ........... G06K 7/081 235/451 |
| 2015/0346889 A1 | 12/2015 | Chen |
| 2016/0077784 A1* | 3/2016 | Yamada ............. G06F 3/03545 345/2.3 |
| 2016/0179221 A1* | 6/2016 | Yamada ............. G06F 3/03542 345/157 |
| 2016/0188049 A1 | 6/2016 | Yang et al. |
| 2017/0308781 A1* | 10/2017 | Foerster ............. G06K 19/067 |
| 2017/0329433 A1* | 11/2017 | Abzarian ............ G06F 3/0393 |
| 2018/0024182 A1* | 1/2018 | Shimomura ......... G01R 29/12 324/538 |
| 2018/0024672 A1* | 1/2018 | Thiele ................. G06K 7/089 345/173 |
| 2018/0173357 A1* | 6/2018 | Park ................. G06F 3/0448 |
| 2019/0021393 A1* | 1/2019 | Novak ................. G06F 3/044 |
| 2019/0080127 A1* | 3/2019 | Yoshida ............. G06F 3/04162 |
| 2019/0138115 A1* | 5/2019 | Thomas, III ......... G06F 3/042 |
| 2019/0302900 A1* | 10/2019 | Lin ................. G06F 3/0321 |
| 2019/0346956 A1* | 11/2019 | Steinmark ........... G06F 3/0412 |
| 2020/0064154 A1* | 2/2020 | Gray ................. G01D 5/12 |
| 2020/0064813 A1* | 2/2020 | Gray ................. G05B 19/418 |
| 2020/0089354 A1* | 3/2020 | Gray ................. G06F 3/0412 |
| 2020/0089382 A1* | 3/2020 | Gray ................. G06F 3/03545 |
| 2020/0125231 A1* | 4/2020 | Sakoda ............. G06F 3/04182 |
| 2020/0158770 A1* | 5/2020 | Huynh ............. H03K 5/24 |
| 2020/0159342 A1* | 5/2020 | Gray ................. G06F 3/0383 |
| 2020/0210007 A1* | 7/2020 | Lee ................. G02F 1/13338 |
| 2020/0302888 A1* | 9/2020 | Van Ostrand ........ G09G 3/3688 |
| 2020/0311359 A1* | 10/2020 | Sajjaanantakul ...... G07D 7/026 |
| 2020/0379049 A1* | 12/2020 | Gray ................. G01R 31/382 |
| 2020/0381942 A1* | 12/2020 | Price ................. H02J 50/80 |
| 2020/0387243 A1* | 12/2020 | Gray ................. G06F 3/0443 |
| 2020/0387244 A1* | 12/2020 | Gray ................. G06F 3/03545 |
| 2020/0387264 A1* | 12/2020 | Van Ostrand ........ G06F 3/0393 |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

* cited by examiner encoded data pattern touchscreen sensing computing device 14 encoded data pattern touchscreen sensing computing device 14

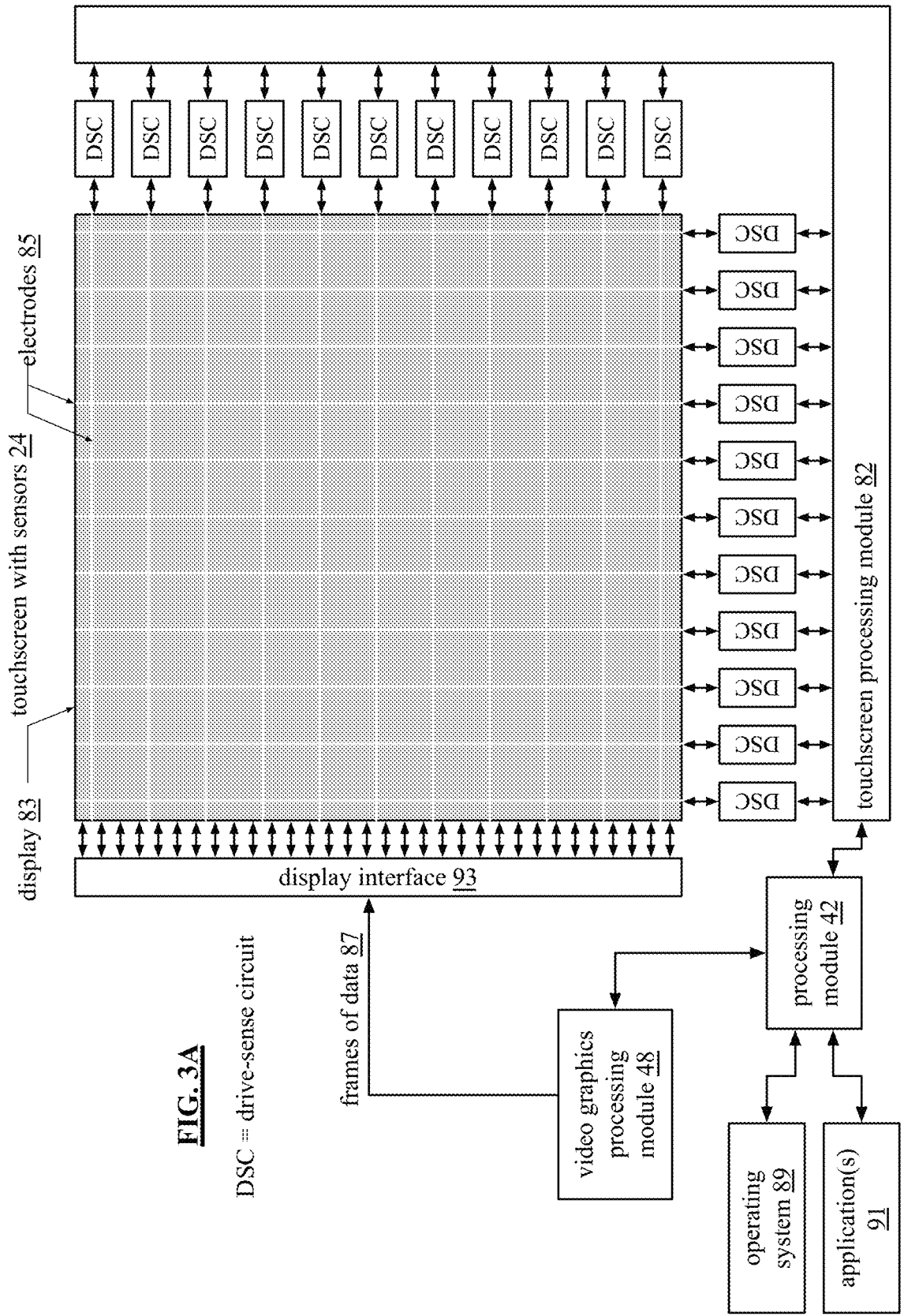

DSC = drive-sense circuit

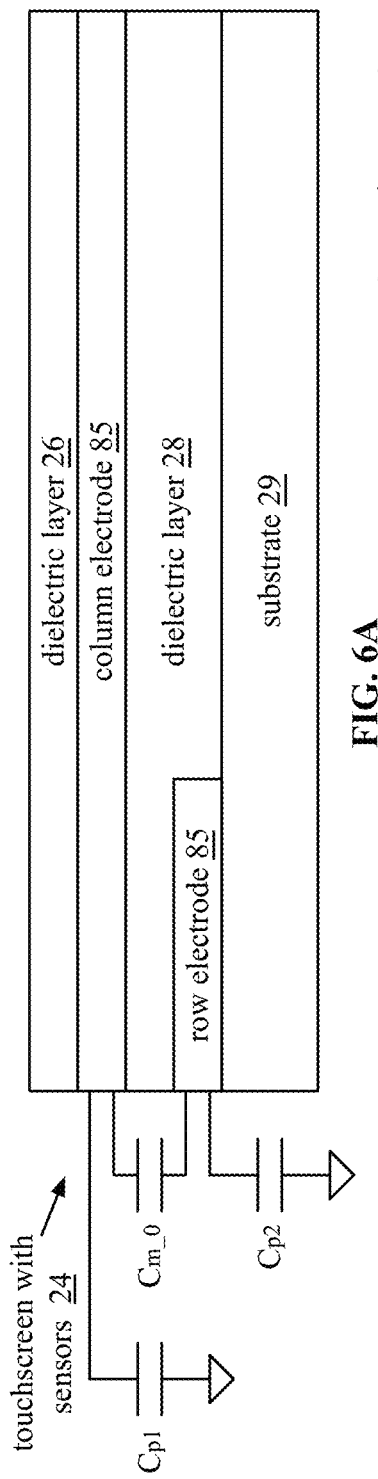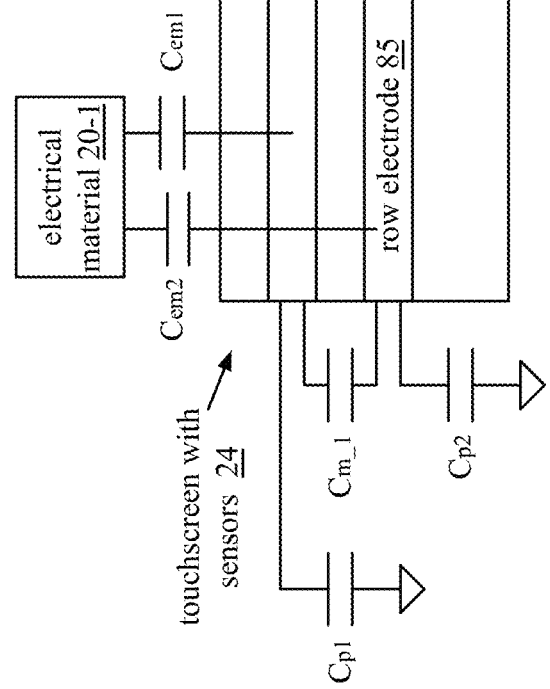

grounded encoded data pattern in close proximity

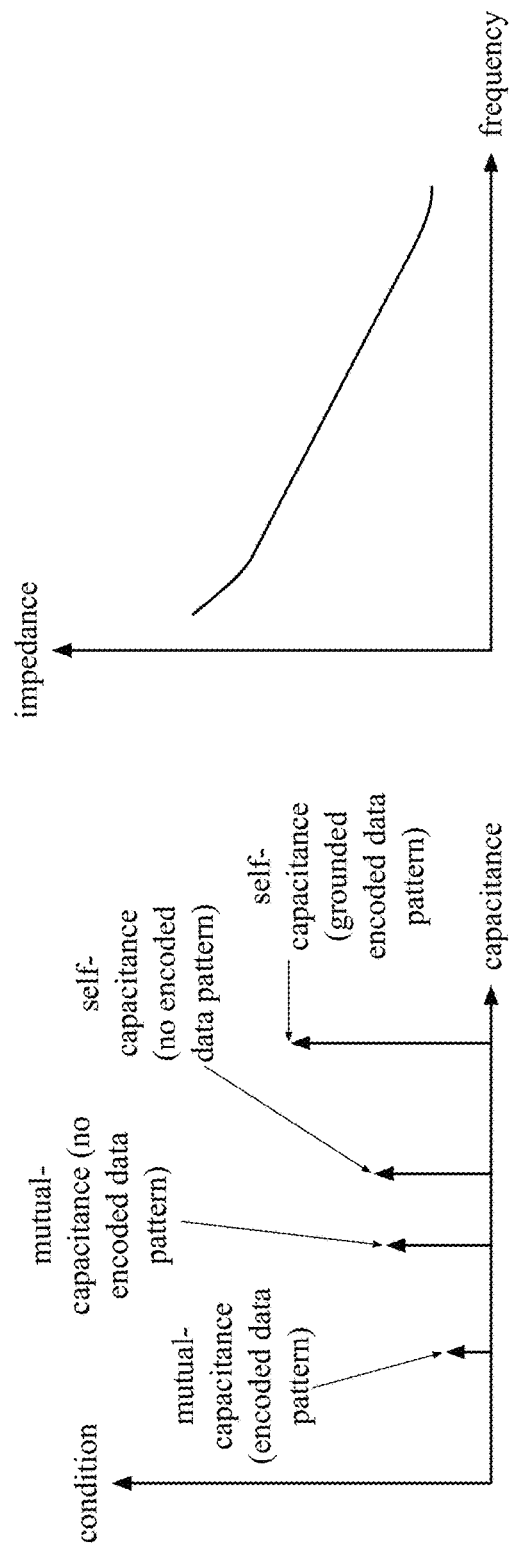
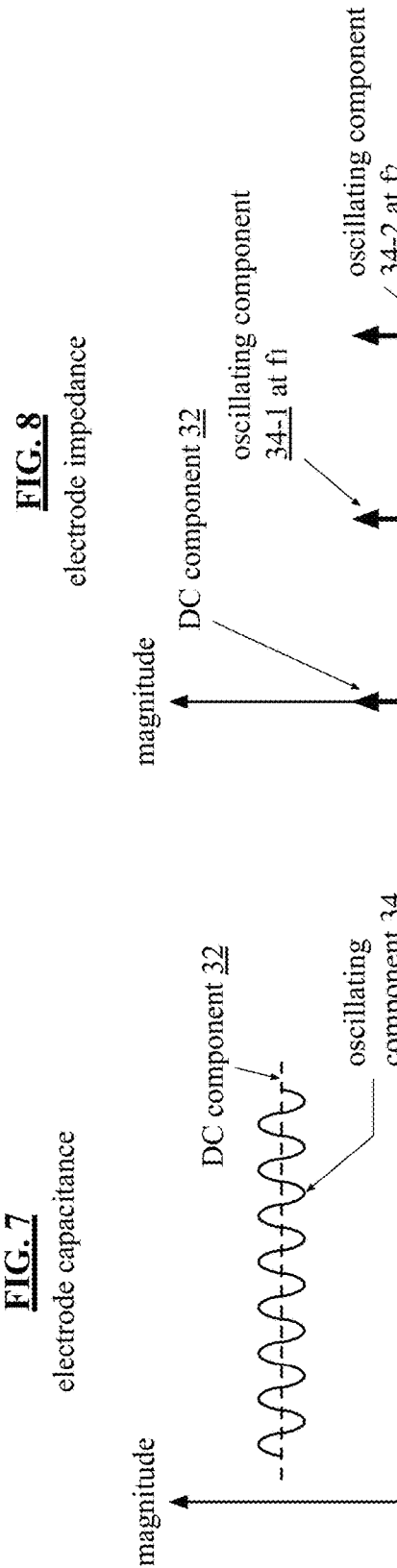
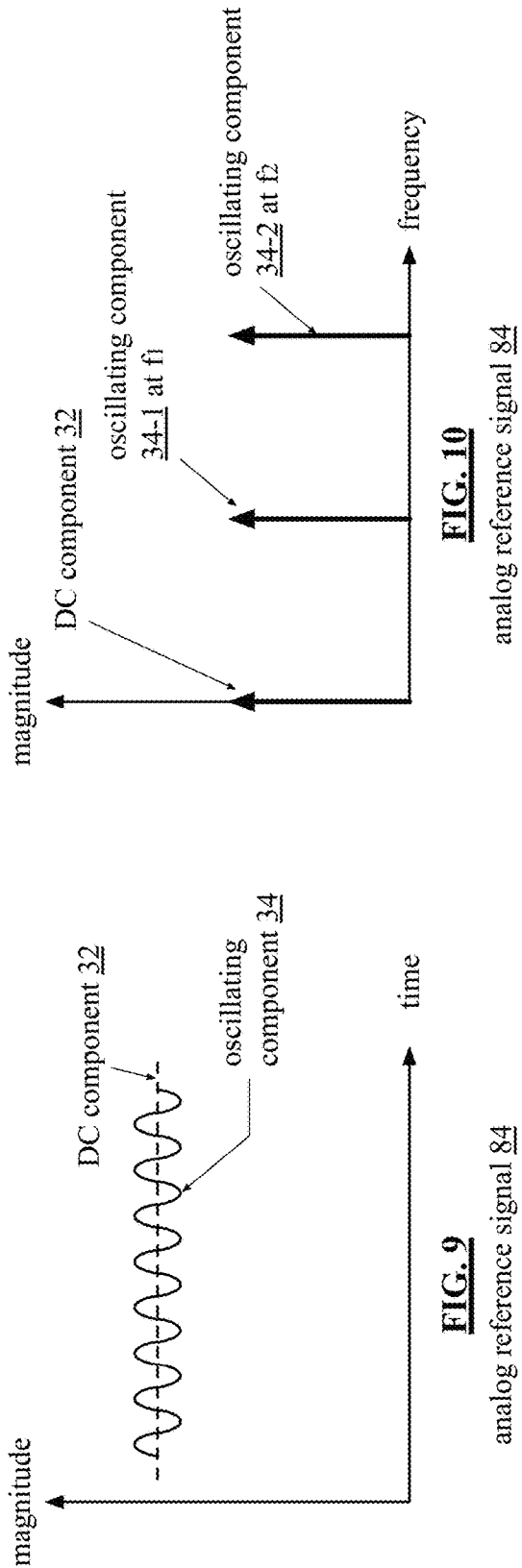
FIG. 7
FIG. 8
FIG. 9
FIG. 10

FIG. 11 no encoded data pattern in close proximity touchscreen 16 touchscreen 16

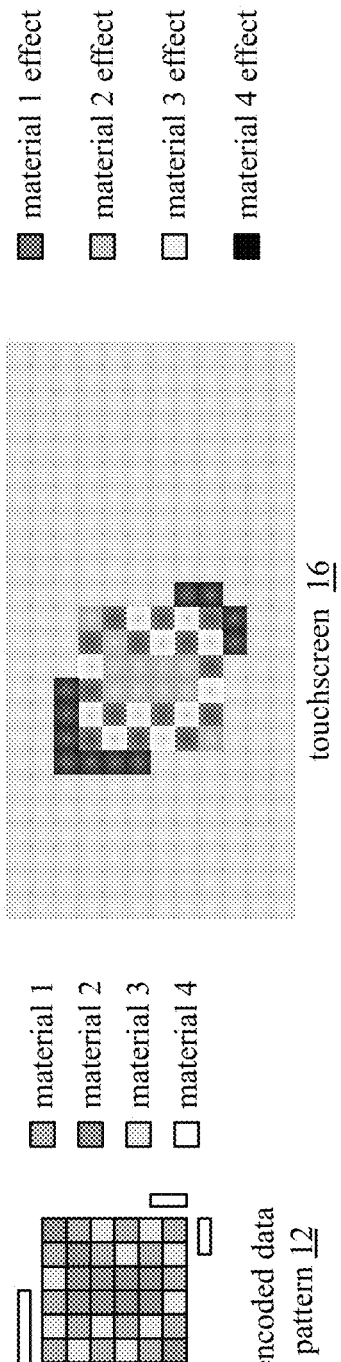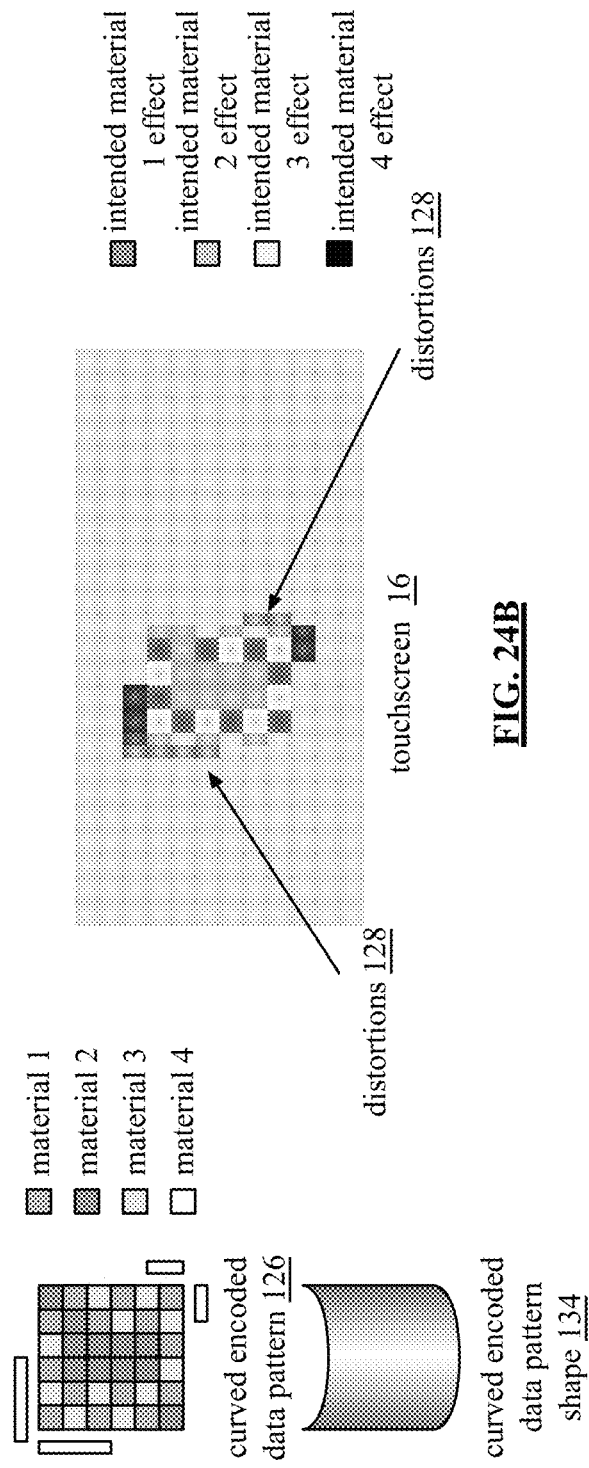
FIG. 24A
FIG. 24B

ENCODED DATA PATTERN TOUCHSCREEN SENSING SYSTEM

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

Graphically coded data is a method of representing data in a visual, machine-readable form. For example, a one-dimensional barcode represents data by varying widths and spacing of parallel lines. Barcodes are read using optical scanning technology such as light-based sensing and camera-based imaging. For example, laser barcode scanners send out a thin beam of light at a barcode to detect the barcode's pattern. Depending on the color of the surface the beam hits, a different amount of light is reflected back.

Digital camera barcode scanners use image processing and decoding algorithms to locate a barcode within a captured image and decode the information in the detected barcode. Imager or charge coupled device (CCD) scanners have hundreds of tiny LED light sensors arranged in one long row that each measure ambient light. When the imager detects a barcode in its field of view, the sensors take a reading of the light to capture a digital image of the barcode.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIGS. 3A-3B are schematic block diagrams of embodiments of a touchscreen with sensors of an encoded data pattern touchscreen sensing computing device in accordance with the present invention;

FIGS. 6A-6C are cross section schematic block diagrams of embodiments of a touchscreen with sensors in accordance with the present invention;

FIG. 7 is an example graph that plots condition verses capacitance for an electrode of a touchscreen in accordance with the present invention;

FIG. 8 is an example graph that plots impedance verses frequency for an electrode of a touchscreen in accordance with the present invention;

FIG. 9 is a time domain example graph that plots magnitude verses time for an analog reference signal in accordance with the present invention;

FIG. 10 is a frequency domain example graph that plots magnitude verses frequency for an analog reference signal in accordance with the present invention;

FIGS. 24A-24B are schematic block diagrams of embodiments of a touchscreen with sensors and drive sensor circuits in close proximity with an encoded data pattern in accordance with the present invention;

DETAILED DESCRIPTION OF THE INVENTION

Figure 1:
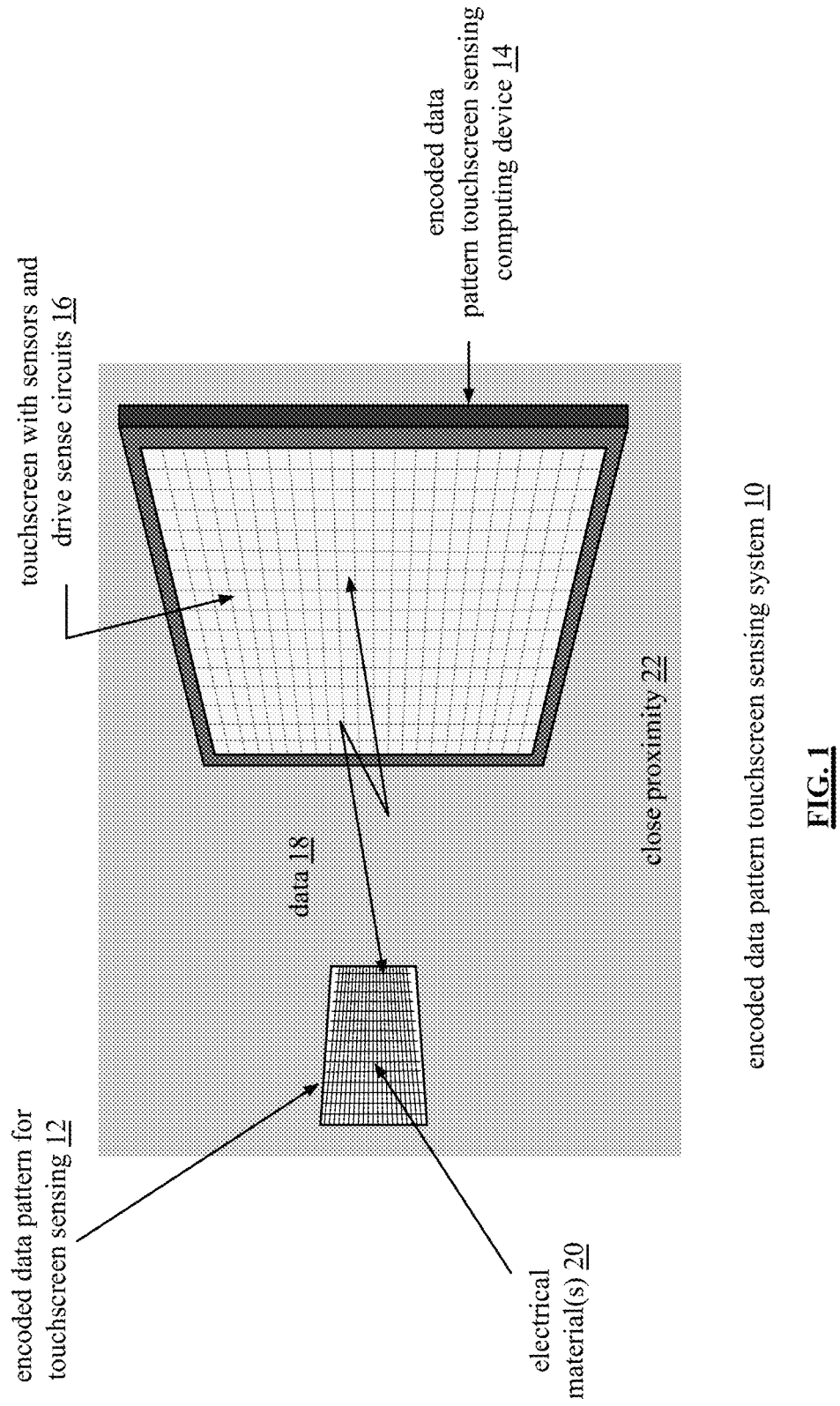
FIG. 1 is a schematic block diagram of an embodiment of an encoded data pattern touchscreen sensing system in accordance with the present invention.

FIG. 1 is a schematic block diagram of an embodiment of an encoded data pattern touchscreen sensing system 10 that includes an encoded data pattern for touchscreen sensing ("encoded data pattern") 12 and an encoded data pattern touchscreen sensing computing device 14. The encoded data pattern 12 includes electrical material(s) 20. The electrical materials 20 are materials that have electrical and/or magnetic properties. The electrical and/or magnetic properties include but are not limited to: conductivity, resistivity, temperature coefficient of resistance, dielectric strength, permittivity, thermoelectricity, and permeability. The ability of a material to conduct electric current is known as the conductivity of the material. Conductive materials include metals such as silver, copper, and gold and some non-metal materials such as graphite. Conversely, the ability of a material to resist the flow of current is known as the electrical resistivity of the material.

Electric insulators such as materials with dielectric properties can be polarized by an applied electric field. The interaction between a dielectric material and an electrostatic field leads to the formation of dipole moments in the atoms of the material known as polarization. This polarization if quantitatively described by a constant known as the permittivity of the material. The permeability of a material indicates how easily magnetic flux builds up in the material. Electric insulators includes materials such as glass, rubber, ceramic, and air. Materials experience changes in their electrical properties under certain conditions. For example, glass is a good insulator at room temperature but becomes a conductor when heated to a very high temperature. As another example, glass can be treated with a transparent conductive material to make conductive (e.g., Indium tin oxide (ITO)).

The electrical material(s) 20 are displayed in a graphically coded pattern representative of data 18. For example, the electrical material(s) are included in an ink (e.g., doped ink) which is printed on a label, packaging, plastic, cardboard, paper, etc. in a particular pattern to represent data. The material that the doped ink is printed onto needs to not interfere with the electrical properties of the electrical materials or needs to be considered in the electrical properties of the encoded data pattern. As another example, the electrical materials are surface coated onto fibers, thread, yarn, etc. The coated fibers are woven into a material (e.g., a fabric) or otherwise included (e.g., knitted, felted, formed, etc.) into a material to form the encoded data pattern. As another example, the electrical materials are etched, embedded, implanted, or otherwise incorporated into a surface.

The data 18 includes one or more of text data and image data. The text data includes one or more of: an alphanumeric sequence, one or more special characters, an identifier (ID) (e.g., a product ID), an encryption key, a decryption key, a passcode, payment information, a website link, account information, personal data, pricing information, and marketing information. Image data includes pixel information representative of an image.

The pattern of the encoded data pattern may be the data itself (e.g., Arabic numerals, roman numerals, letters, punctuation marks, special characters, etc.) or symbols representative of the data (e.g., parallel bars and spaces as in a one dimensional barcode, a unique pattern of shapes such as a two-dimensional barcode, shapes to represent data, combination of shapes to represent data, location of particular shapes to represent data, etc.). Examples of encoded data patterns are discussed in greater detail with reference to FIGS. 15-19.

The encoded data pattern touchscreen sensing computing device 14 includes a touchscreen with sensors and drive-sense circuits ("touchscreen") 16. The encoded data pattern touchscreen sensing computing device 14 may include a display. The encoded data pattern touchscreen sensing computing device 14 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

A sensor of the touchscreen 16 functions to convert a physical input into an electrical output and/or an optical output. The physical input of a sensor may be one of a variety of physical input conditions. For example, the physical condition includes an electric condition of the electrical material(s) 20 (e.g., charge, voltage, current, conductivity, permittivity, eclectic field, which includes amplitude, phase, and/or polarization). There are a variety of types of sensors to sense the various types of physical conditions. For example, to sense the electric condition of the electrical material(s) 20, the sensor types include, but are not limited to, capacitor sensors, inductive sensors, touch sensors, and proximity sensors.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

Each sensor of the touchscreen 16 is coupled to a drive-sense circuit (DSC). The DSCs provide electrode signals to the sensors and detect changes in electrical characteristics of the sensors. The DSCs will be described in greater detail with reference to FIG. 4 and as described in co-pending patent application entitled, "DRIVE SENSE CIRCUIT WITH DRIVE-SENSE LINE," having a serial number of Ser. No. 16/113,379, and a filing date of Aug. 27, 2018.

At the time this application was written, encoded data pattern scanning technology (e.g., barcode scanning) relies primarily on optics (e.g., light beam, laser, and/or camera imaging) to detect and interpret data. In contrast, a touchscreen works by detecting and interpreting electrical characteristics of sensors affected by a touch (e.g., sensors contacted with a conductive material such as a finger, stylus, etc.). Similarly, the encoded data pattern touchscreen sensing computing device 14 reads the encoded data pattern 12 by detecting impedance changes in sensors affected by the electrical materials 20 of the encoded data pattern 12.

In an example of operation, when the encoded data pattern touchscreen sensing computing device 14 is in close proximity 22 to the encoded data pattern 12, the electrical characteristics of the sensors of the touchscreen 16 are affected by the electrical materials 20 of the encoded data pattern 12. The drive-sense circuits of the touchscreen provide a regulated source signal or power signal to the sensors and detect the effects to the regulated source signal or power signal based on electrical characteristics of the sensors. The drive-sense circuits generate representative signals of the detected effects which are interpreted by the encoded data pattern touchscreen sensing computing device 14 as the data 18.

Figure 2A:
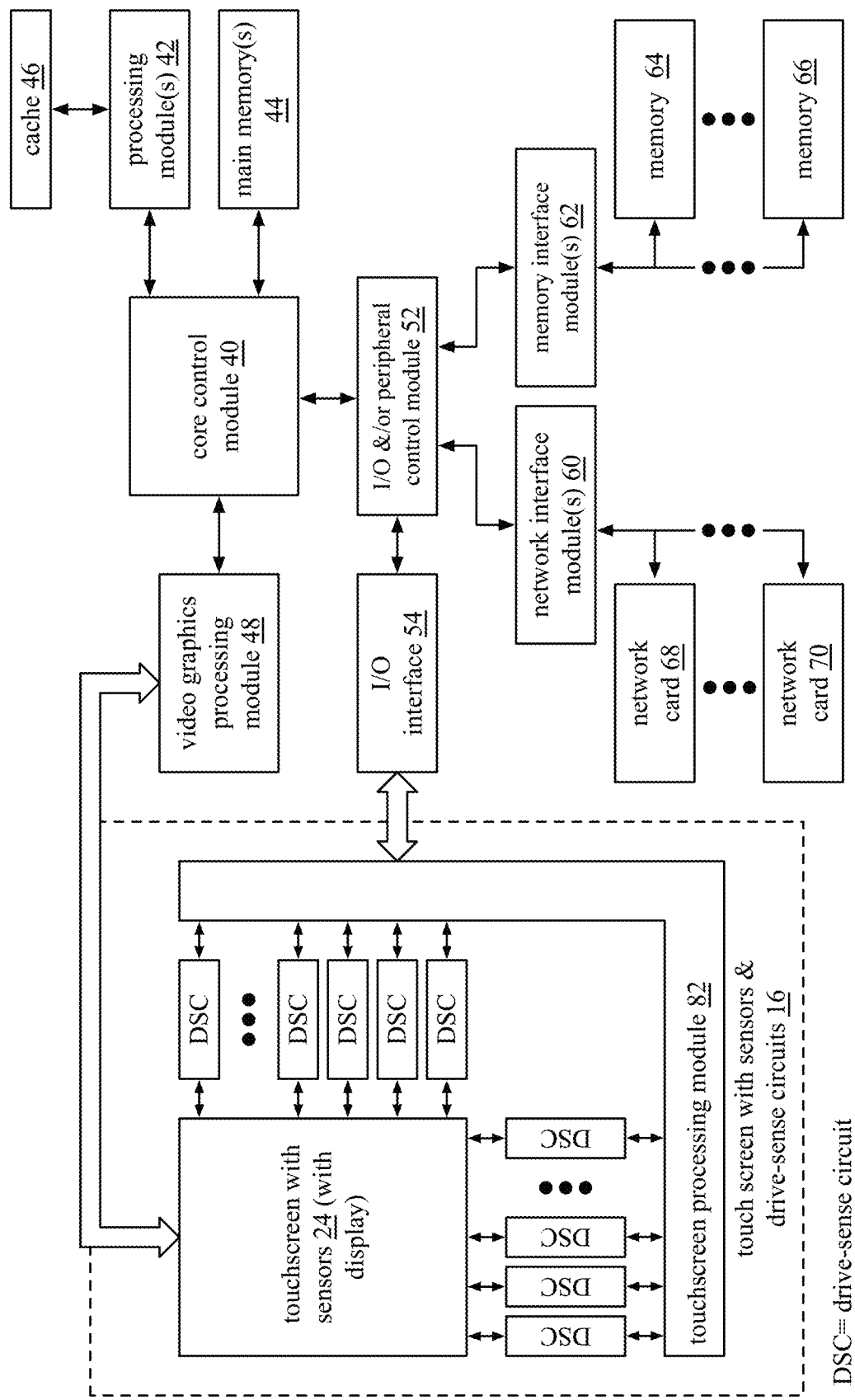
FIGS. 2A-2B are schematic block diagrams of embodiments of an encoded data pattern touchscreen sensing computing device in accordance with the present invention.
Figure 2B:
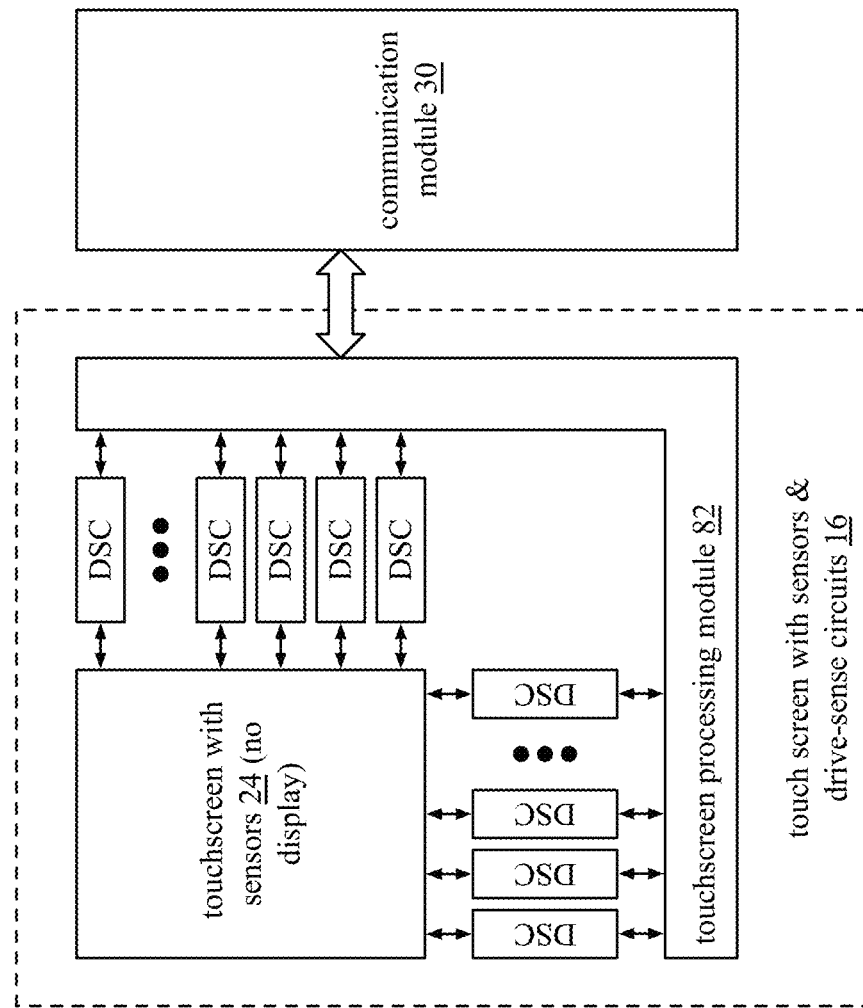

FIGS. 2A-2B are schematic block diagrams of embodiments of an encoded data pattern touchscreen sensing computing device 14. In FIG. 2A, the encoded data pattern touchscreen sensing computing device 14 includes a touchscreen 16, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touchscreen 16 includes a touchscreen with a plurality of sensors 24, a plurality of drive-sense circuits (DSCs), and a touchscreen processing module 82. The touchscreen with a plurality of sensors 24 includes a display in this example. For example, the encoded data pattern touchscreen sensing computing device 14 operates as a touchscreen device (e.g., a smartphone, laptop, etc.) with many standard display and touch functions. In addition to the standard display and touch functions, the encoded data pattern touchscreen sensing computing device 14 is operable to sense an encoded data pattern, display information pertaining to the encoded data pattern, and allow user interaction with the encoded data pattern and/or the information pertaining to the encoded data pattern.

In general, the sensors (e.g., electrodes, capacitor sensing cells, capacitor sensors, inductive sensor, etc.) of the touchscreen 24 are affected by the electrical properties of certain materials. For example, when one or more fingers (e.g., a conductor) touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

As another example, when the touchscreen 16 is in close proximity to an encoded data pattern (e.g., the electrical properties of the electrical materials), capacitance of sensors proximal to the electrical materials of the encoded data pattern are affected (e.g., impedance changes). The drive-sense circuits (DSC) coupled to the affected sensors detect the change and provide a representation of the change to the touchscreen processing module 82.

The touchscreen processing module 82 processes the representative signals from the drive-sense circuits (DSC) to detect the encoded data pattern and determine the data that the encoded data pattern represents. For example, the touchscreen processing module 82 interprets the representative signals as a set of impedance values representative of the electrical characteristics of the encoded data pattern. The touchscreen processing module 82 interprets the set of impedance values to determine the data. For example, a particular set of impedance values in a certain area and in a particular shape and/or position represents a particular symbol (e.g., an alpha numeric character).

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2B operates similarly to FIG. 2A except that the touchscreen with sensors 24 does not include a display and the encoded data pattern touchscreen sensing computing device 14 includes a communication module 30. The communication module 30 includes a wireless communication unit and/or a wired communication unit. A wireless communication unit includes a wireless local area network (WLAN) communication device, a cellular communication device, a Bluetooth device, and/or a ZigBee communication device.

A wired communication unit includes a Gigabit LAN connection, a Firewire connection, and/or a proprietary computer wired connection. Regardless of the specific implementation of the communication module 30, it is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

The touchscreen processing module 82 processes the representative signals from the drive-sense circuits (DSC) to detect the encoded data pattern and determine the data that the encoded data pattern represents. The touchscreen processing module 82 communicates the data to the communication module 30. Alternatively, the touchscreen processing module 82 passes the representative signals from the drive-sense circuits or a set of impedance values representative of the electrical characteristics of the encoded data pattern to the communication module 30 and the communication module passes the information to another computing device for processing.

The sending of the data may include formatting the data in a particular format with respect to the communication protocol of the communication module 30. The communication module 30 is operable to communicate the data via one or more communication protocols. For example, the communication module 30 communicates the data to another computing device via a Bluetooth connection. The computing device is operable to display and/or further process and/or store the data.

Figure 3B:
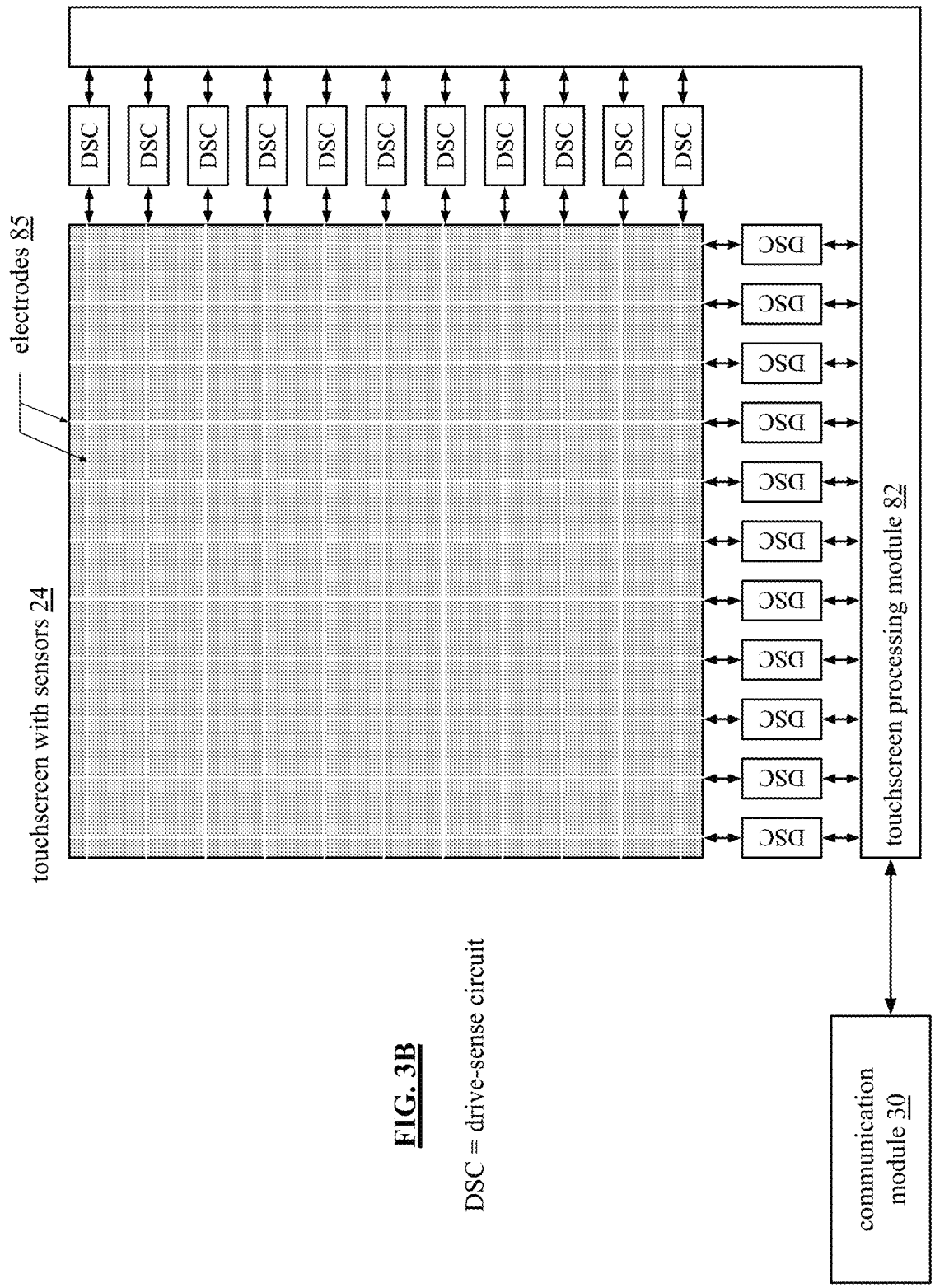

FIGS. 3A-3B are schematic block diagrams of embodiments of a touchscreen with sensors 24 of an encoded data pattern touchscreen sensing computing device 14. In FIG. 3A, the touchscreen with sensors 24 includes a plurality of drive-sense circuits (DSCs), a touchscreen processing module 82, a display 83, and a plurality of electrodes 85. The touchscreen with sensors 24 is coupled to a processing module 42, a video graphics processing module 48, and a display interface 93, which are components of the encoded data pattern touchscreen sensing computing device 14.

In this example, the touchscreen with sensors 24 includes a display 83 operable to render frames of data into visible images. The display 83 may be large with a resolution equal to or greater than full high-definition (HD), an aspect ratio of a set of aspect ratios, and a screen size equal to or greater than thirty-two inches. The following table lists various combinations of resolution, aspect ratio, and screen size for a large display 83, but it is not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

Alternatively, the display 83 may be small to medium (e.g., that of a handheld device, laptop, desktop, etc.) with varying levels of resolution depending on the application. The display 83 is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for sensing touch as well as encoded data patterns. The electrodes 85 are distributed throughout the display area or where sensing functionality is desired. For example, a first group of the electrodes are arranged in rows and a second group of electrodes are arranged in columns. The row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, an encoded data pattern reading/displaying/decoding application, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly or close by) is changed. The DSCs detect the capacitance change for effected electrodes and provide the detected change to the touch screen processing module 82.

The touch screen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

As another example, when the screen is in close proximity to an encoded data pattern, capacitance of the electrodes 85 proximal to the encoded data pattern is changed. The DSCs detect the capacitance change for effected electrodes and provide the detected change to the touchscreen processing module 82.

The touchscreen processing module 82 processes the capacitance change of the effected electrodes to detect the encoded data pattern and provide this encoded data pattern to the processing module 42. For example, the touchscreen processing module 82 interprets the detected changes as a set of impedance values representative of the electrical characteristics of the encoded data pattern. The touchscreen processing module 82 interprets the set of impedance values to determine the data. For example, a particular set of impedance values in a certain area and in a particular shape and/or position represents a particular symbol (e.g., an alpha numeric character).

FIG. 3B operates similarly to FIG. 3A except that the touchscreen with sensors 24 does not include a display and the touchscreen processing module 82 is coupled to a communication module 30. The touchscreen processing module 82 processes the capacitance change of the effected electrodes to detect an encoded data pattern in close proximity to the touchscreen and send the encoded data pattern information to the touchscreen processing module 82. The touchscreen processing module 82 processes the representative signals from the drive-sense circuits (DSC) to detect the encoded data pattern and determine the data that the encoded data pattern represents. For example, the touchscreen processing module 82 interprets the representative signals as a set of impedance values representative of the electrical characteristics of the encoded data pattern. The touchscreen processing module 82 interprets the set of impedance values to determine the data. For example, a particular set of impedance values in a certain area and in a particular shape and/or position represents a particular symbol (e.g., an alpha numeric character).

The touchscreen processing module 82 communicates the data to the communication module 30 for communication with other devices, processing modules, displays, etc. Alternatively, the touchscreen processing module 82 passes the representative signals from the drive-sense circuits or a set of impedance values representative of the electrical characteristics of the encoded data pattern to the communication module 30 and the communication module passes the information to another computing device for processing.

In this example, the encoded data pattern touchscreen sensing computing device 14 may or may not have touch sense capabilities as well as encoded data pattern sensing capabilities. If touch sense capabilities are included, connection to an external computing device and/or display via the communication module 30 aids in the touch sense functionality (e.g., a touch on the touchscreen translates to a command or function relating to an external display).

Figure 4:
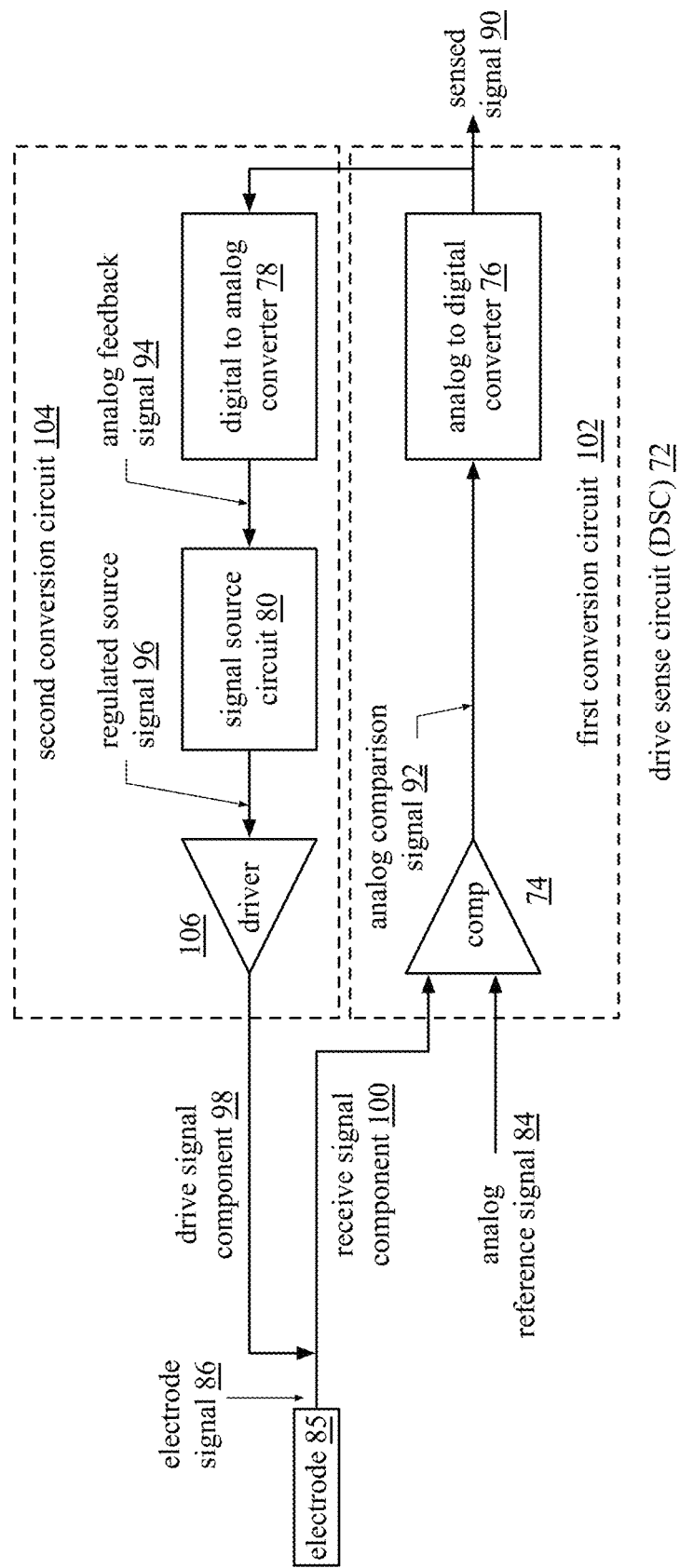
FIG. 4 is a schematic block diagram of an embodiment of a drive sense circuit (DSC) in accordance with the present invention.

FIG. 4 is a schematic block diagram of an embodiment of a drive sense circuit (DSC) 72 that includes a first conversion circuit 102 and a second conversion circuit 104. The first conversion circuit 102 includes comparator (comp) 74 and an analog to digital converter (ADC) 76. The second conversion circuit 104 includes a digital to analog converter (DAC) 78, a signal source circuit 80, and a driver 106. The analog to digital converter (ADC) 76 may be implemented in a variety of ways. For example, the (ADC) 76 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The feedback loop of the drive sense circuit 72 functions to keep the electrode signal 86 substantially matching the analog reference signal 84. As such, the electrode signal 86 will have a similar waveform to that of the analog reference signal 84. The electrode signal 86 includes a drive signal component 98 and a receive signal component 100.

The analog reference signal 84 includes a DC component and one or more oscillating components. The DC component is a DC voltage in the range of a few hundred milli-volts to tens of volts or more. The oscillating component includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component may vary so that it can be tuned to the impedance of the sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

The first conversion circuit 102 converts the electrode signal 86 into a sensed signal 90. The second conversion circuit 104 generates the drive signal component 98 from the sensed signal 90. As an example, the first and second conversion circuits 102 and 104 function to keep the electrode signal 86 substantially constant (e.g., substantially matching the reference signal 84) with the first conversion circuit creating the sensed signal 90 to correspond to changes in a receive signal component 100 of the electrode signal 86 and the second conversion circuit 104 functions generating the drive signal component 98 based on the sensed signal 90.

In an example, the electrode signal 86 is provided to an electrode 85 as a regulated current signal. The regulated current (I) signal in combination with the impedance (Z) of the electrode creates a voltage (V), where V=I*Z. As the impedance (Z) of the electrode changes, the regulated current (I) signal is adjusted to keep the voltage (V) substantially unchanged. To regulate the current signal, the DSC adjusts the sensed signal 90 and the drive signal component 98 based on the receive signal component 100, which is indicative of the impedance change of the electrode.

More specifically, the comparator 74 compares the electrode signal 86 to the analog reference signal 84 having the oscillating component frequency to produce an analog comparison signal 92. The analog reference signal 84 (e.g., a current signal or a voltage signal) includes a DC component and an oscillating component at a first frequency. The DC component is a DC voltage in the range of a few tens of milli-volts to tens of volts or more. The oscillating component includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). In another example, the frequency of the oscillating component may vary so that it can be tuned to the impedance of the electrode and/or to be off-set in frequency from other electrode signals.

In an embodiment, a processing module (e.g., the touchscreen processing module) provides analog reference signals to the drive sense circuits. For example, each drive sense circuit receives a unique analog reference signal. As another example, a first group of drive sense circuits receive a first analog reference signal and a second group of drive sense circuits receive a second analog reference signal. In yet another example, the drive sense circuits receive the same analog reference signal. Note that the processing module uses a combination of analog reference signals with control signals to ensure that different frequencies are used for oscillating components of the analog reference signal.

The analog to digital converter 76 converts the analog comparison signal 84 into the sensed signal 90. Because the analog reference signal 84 includes a DC component and an oscillating component the sensed signal 90 will have a substantially matching DC component and oscillating component.

The second conversion circuit 104 adjusts the regulated current based on the changes to the sensed signal 90. More specifically, the digital to analog converter (DAC) 78 converts the sensed signal 90 into an analog feedback signal 94. The signal source circuit 80 (e.g., a dependent current source, a linear regulator, a DC-DC power supply, etc.) generates a regulated source signal 96 (e.g., a regulated current signal or a regulated voltage signal) based on the analog feedback signal 94. The driver 106 increases power of the regulated source signal 94 to produce the drive signal component 86. Note that, in an embodiment, the driver may be omitted.

As another example, the electrode signal 86 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 102 adjusts the sensed signal 90 based on the receive signal component 100, which is indicative of the impedance change of the electrode. The second conversion circuit 104 adjusts the regulated voltage based on the changes to the sensed signal 90.

Figure 5A:
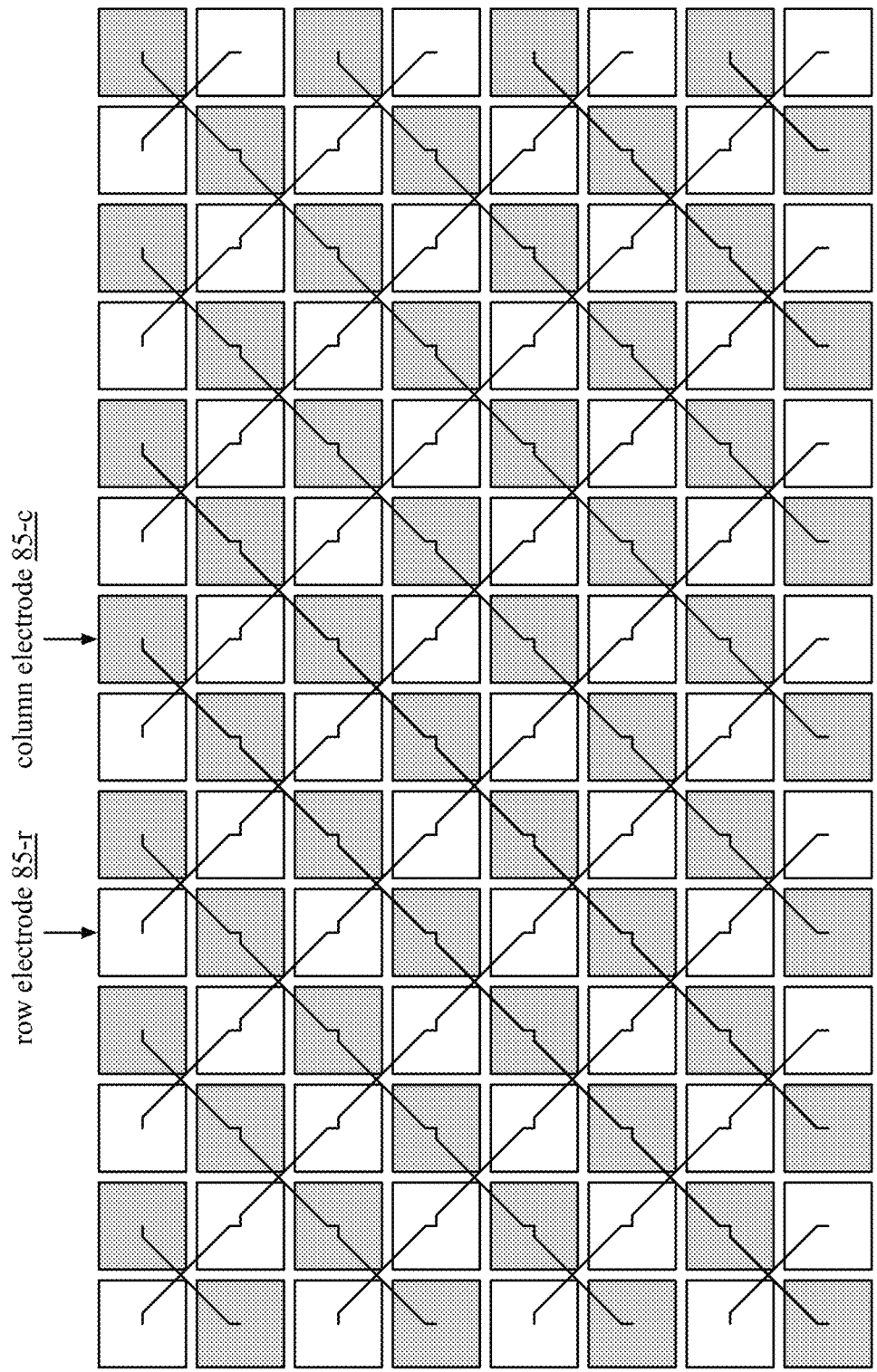
FIGS. 5A-5B are schematic block diagrams of embodiments of a touchscreen electrode pattern in accordance with the present invention.
Figure 5B:
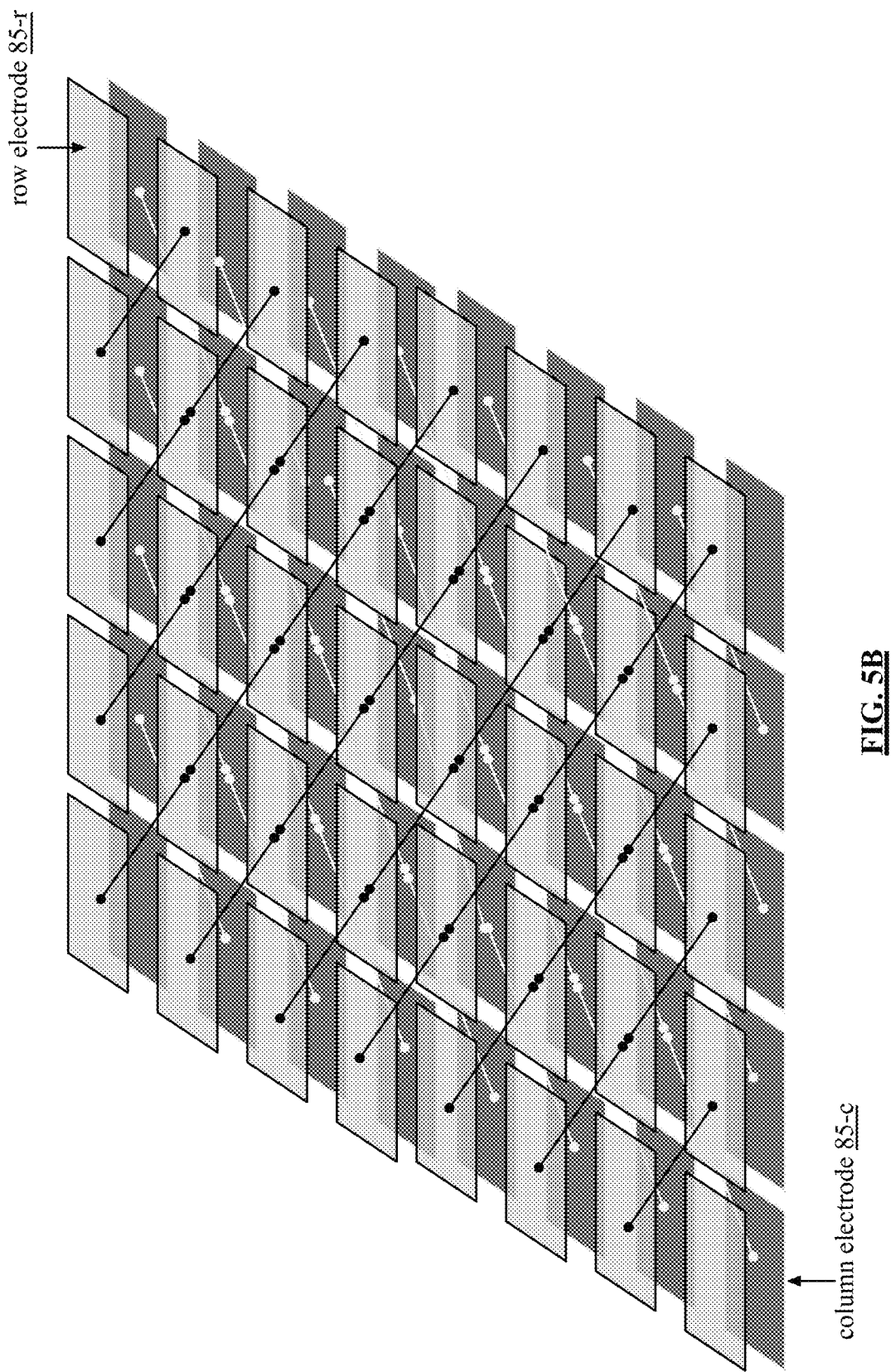

FIGS. 5A-5B are schematic block diagrams of embodiments of a touchscreen electrode pattern that includes rows of electrodes 85-$r$ and columns of electrodes 85-$c$. Each row of electrodes 85-$r$ and each column of electrodes 85-$c$ includes a plurality of individual conductive cells (e.g., capacitive sense plates) (e.g., light gray squares for rows, dark gray squares for columns) that are electrically coupled together. The size of a conductive cell depends on the desired resolution of sensing.

For example, a conductive cell size may be 1 millimeter by 1 millimeter or less to 5 millimeters by 5 millimeters or more and based on the size of the encoded data patterns to be detected. Making the conductive cells smaller improves sensing resolution and will typically reduce sensor errors. While the cells are shown to be square, they may be of any polygonal shape, diamond, or circular shape.

The cells for the rows and columns may be on the same layer or on different layers. In FIG. 5A, the cells for the rows and columns are shown on the same layer. In FIG. 5B, the cells for the rows and columns are shown on different layers. The electric coupling between the cells is done using vias and running traces (e.g., wire traces) on another layer. Note that the cells are on one or more layers (e.g., ITO layers) of the touchscreen.

Figure 6C:
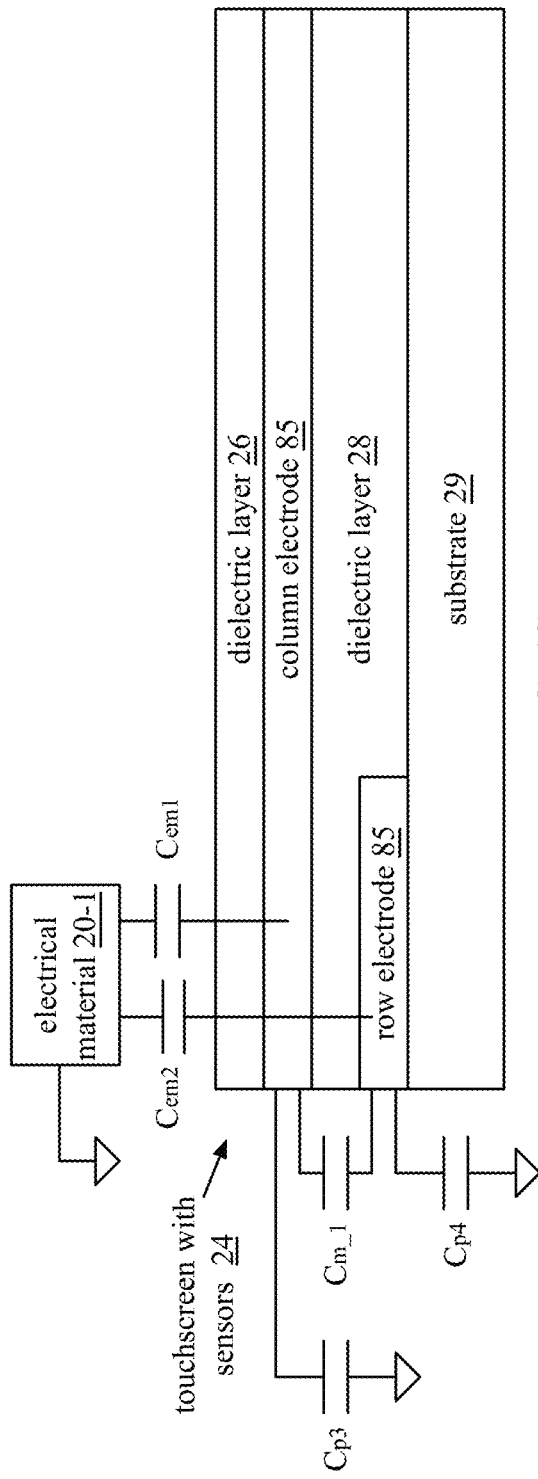

FIGS. 6A-6C are cross section schematic block diagrams of embodiments of a touchscreen with sensors ("touchscreen") 24. In FIG. 6A, the touchscreen 24 is not in close proximity to an encoded data pattern. The cross section is taken parallel to a column electrode 85-$c$ and a perpendicular to a row electrode 85-$r$. The column electrode 85-$c$ is positioned between two dielectric layers 26 and 28. Alternatively, the column electrode 85-$c$ is in the second dielectric layer 28. The row electrode 85-$r$ is positioned in the second dielectric layer 28. Alternatively, the row electrode 85-$r$ is positioned between the dielectric layer 28 and the substrate 29. As another alternative, the row and column electrodes are in the same layer.

Each electrode 85 has a self-capacitance, which corresponds to a parasitic capacitance created by the electrode with respect to other conductors in the touchscreen (e.g., ground, conductive layer(s), and/or one or more other electrodes). For example, row electrode 85-$r$ has a parasitic capacitance $C_{p2}$ and column electrode 85-$c$ has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance. A mutual capacitance ($C_{m\_0}$) exists between the electrodes.

As shown, the touchscreen 24 includes a plurality of layers 26-29. Each illustrated layer may itself include one or more layers. For example, dielectric layer 26 includes a surface protective film, a glass protective film, and/or one or more pressure sensitive adhesive (PSA) layers. As another example, the second dielectric layer 28 includes a glass cover, a polyester (PET) film, a support plate (glass or plastic) to support, or embed, one or more of the electrodes 85-$c$ and 85-$r$, a base plate (glass, plastic, or PET), and one or more PSA layers. As yet another example, the substrate 29 includes one or more LCD layers, a back-light layer, one or more reflector layers, one or more polarizing layers, and/or one or more PSA layers.

In FIG. 6B, the touchscreen 24 is in close proximity to an encoded data pattern consisting of one or more electrical material(s). A mutual capacitance change occurs ($C_{m\_1}$) between the electrodes when the electrical materials are in close proximity. In this zoomed in example, the capacitance of an electrical material 20-1 ($C_{em1}$) of the encoded data pattern is effectively in series with the mutual capacitance, which decreases capacitance of the mutual capacitance.

As the capacitance decreases for a given frequency, the impedance increases. The change in impedance of the mutual-capacitance is detectable by a corresponding drive sense circuit and is subsequently processed to indicate an electrical material. Note that, depending on the various properties (e.g., thicknesses, dielectric constants, electrode sizes, electrode spacing, etc.) of the touch screen display, the parasitic capacitances, the mutual capacitances, and/or the electrical material capacitance are in the range of a few pico-Farads to tens of nano-Farads. In equation form, the capacitance (C) equals:

$$C = \epsilon \frac{A}{d}$$

where A is plate area, ∈ is the dielectric constant(s), and d is the distance between the plates.

In this example, the electrical material 20-1 is not grounded. For example, the encoded data pattern is a printed label on an ungrounded surface. Therefore, the electrical material 20-1's presence affects the mutual capacitance of the electrodes but not the self-capacitance. Different electrical materials will have different effects on the electrodes. For example, electrical material 20-1 may decrease the mutual capacitance of the electrode by "x" amount and a different electrical material 20-n may decrease the mutual capacitance of the electrode by "y" amount.

In FIG. 6C, the touchscreen 24 is in close proximity to a grounded encoded data pattern consisting of one or more electrical material(s). An encoded data pattern may be grounded via human touch (e.g., a person is holding the encoded data pattern), via an encoded data pattern ground connection, via an action where a ground connection loop is closed as the encoded data pattern is being detected by the encoded data pattern touchscreen sensing computing device, etc.

The grounded encoded data pattern changes the mutual capacitance of the electrodes as discussed with reference to FIG. 6B as well as the self-capacitance. In essence, a grounded electrical material 20-1 creates a parallel capacitance with the parasitic self-capacitances. For example, the self-capacitance of the column electrode 85-c is $C_{p3}=C_{p1}$ (parasitic capacitance)+$C_{em1}$ (electrical material capacitance) and the self-capacitance of the row electrode 85-r is $C_{p4}=C_{p2}+C_{em2}$. As such, the electrical material capacitance increases the self-capacitance of the electrodes, which decreases the impedance for a given frequency. The change in impedance of the self-capacitance is detectable by a corresponding drive sense circuit and is subsequently processed to indicate an encoded data pattern.

FIG. 7 is an example graph that plots condition verses capacitance for an electrode of a touchscreen. As shown, the mutual capacitance decreases when an encoded data pattern is in close proximity and the self-capacitance increases when a grounded encoded data pattern is in close proximity. Note that the mutual capacitance and self-capacitance for no encoded data pattern in close proximity are shown to be about the same. This is done merely for ease of illustration. In practice, the mutual capacitance and self-capacitance may or may not be about the same capacitance based on the various properties of the touchscreen discussed above.

FIG. 8 is an example graph that plots impedance verses frequency for an electrode of a touchscreen. Since the impedance of an electrode is primarily based on its capacitance (self and/or mutual), as the frequency increases for a fixed capacitance, the impedance decreases based on $1/2\pi fC$, where f is the frequency and C is the capacitance.

FIG. 9 is a time domain example graph that plots magnitude verses time for an analog reference signal 84. As discussed with reference to FIG. 4, the analog reference signal 84 (e.g., a current signal or a voltage signal) is inputted to a comparator and is compared to the electrode signal 86. The feedback loop of the drive sense circuit 72 functions to keep the electrode signal 86 substantially matching the analog reference signal 84. As such, the electrode signal 86 will have a similar waveform to that of the analog reference signal 84.

In an example, the analog reference signal 84 includes a DC component 32 and/or one or more oscillating components 34. The DC component 84 is a DC voltage in the range of a few hundred milli-volts to tens of volts or more. The oscillating component 34 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 32 may vary so that it can be tuned to the impedance of the electrode and/or to be off-set in frequency from other electrode signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 10 is a frequency domain example graph that plots magnitude verses frequency for an analog reference signal 84. As shown, the analog reference signal 84 includes the DC component 32 at DC (e.g., 0 Hz or near 0 Hz), a first oscillating component 34-1 at a first frequency ($f_1$), and a second oscillating component 34-2 at a second frequency ($f_2$). In an example, the DC component is used to measure resistance of an electrode (if desired), the first oscillating component 34-1 is used to measure the impedance of self-capacitance, and the second oscillating component 34-2 is used to measure the impedance of mutual-capacitance. Note that the second frequency may be greater than the first frequency.

Figure 11:
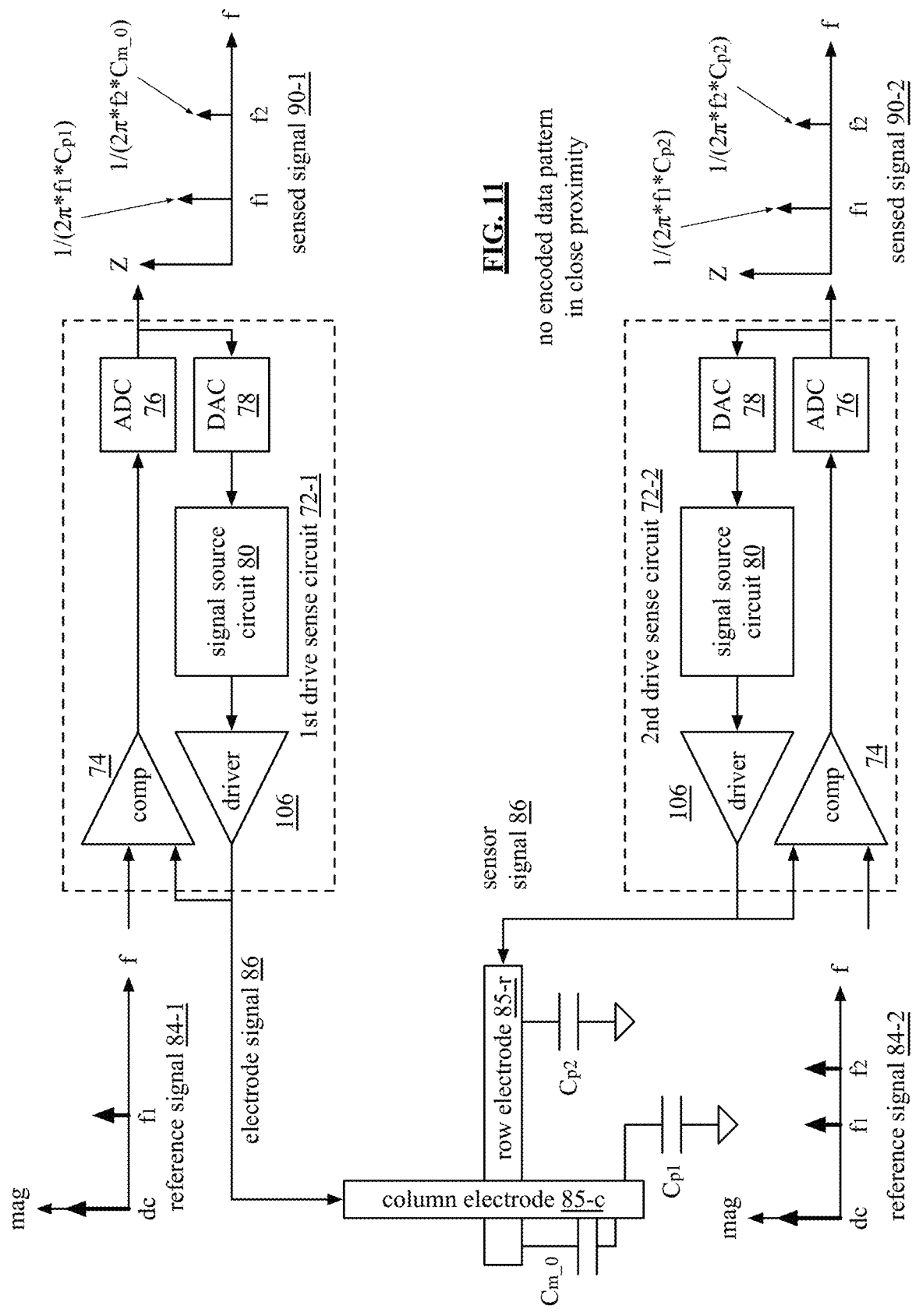
FIG. 11 is a schematic block diagram of an example of a first drive sense circuit coupled to a first electrode and a second drive sense circuit coupled to a second electrode in accordance with the present invention.

FIG. 11 is a schematic block diagram of an example of a first drive sense circuit 72-1 coupled to a first electrode 85-c and a second drive sense circuit 72-2 coupled to a second electrode 85-r without an encoded data pattern in close proximity. Each of the drive sense circuits include a comparator 74, an analog to digital converter (ADC) 76, a digital to analog converter (DAC) 78, a signal source circuit 80, and a driver 106. The functionality of this embodiment of a drive sense circuit was described with reference to FIG. 4.

As an example, a first reference signal 84-1 (e.g., analog or digital) is provided to the first drive sense circuit 72-1 and a second reference signal 84-2 (e.g., analog or digital) is provided to the second drive sense circuit 72-2. The first reference signal includes a DC component and/or an oscillating at frequency $f_1$. The second reference signal includes a DC component and/or two oscillating components: the first at frequency $f_1$ and the second at frequency $f_2$.

The first drive sense circuit 72-1 generates an electrode signal 86 based on the reference signal 84-1 and provides the electrode signal to the column electrode 85-c. The second drive sense circuit generates another electrode signal 86 based on the reference signal 84-2 and provides the electrode signal to the column electrode.

In response to the electrode signals being applied to the electrodes, the first drive sense circuit 72-1 generates a first sensed signal 90-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-c and 85-r. The self-capacitance is expressed as $1/(2\pi f_1 C_{p1})$ and the mutual capacitance is expressed as $1/(2\pi f_2 C_{m\_0})$.

Also, in response to the electrode signals being applied to the electrodes, the second drive sense circuit 72-1 generates a second sensed signal 90-2, which includes a component at frequency $f_1$ and a component a frequency $f_2$. The component at frequency $f_1$ corresponds to a shielded self-capacitance of the row electrode 85-r and the component a frequency $f_2$ corresponds to an unshielded self-capacitance of the row electrode 85-r. The shielded self-capacitance of the row electrode is expressed as $1/(2\pi f_1 C_{p2})$ and the unshielded self-capacitance of the row electrode is expressed as $1/(2\pi f_2 C_{p2})$.

With each active drive sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive sense circuits. In this example, with the second drive sense circuit transmitting the second frequency component, it has a second frequency component in its sensed signal but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

Figure 12:
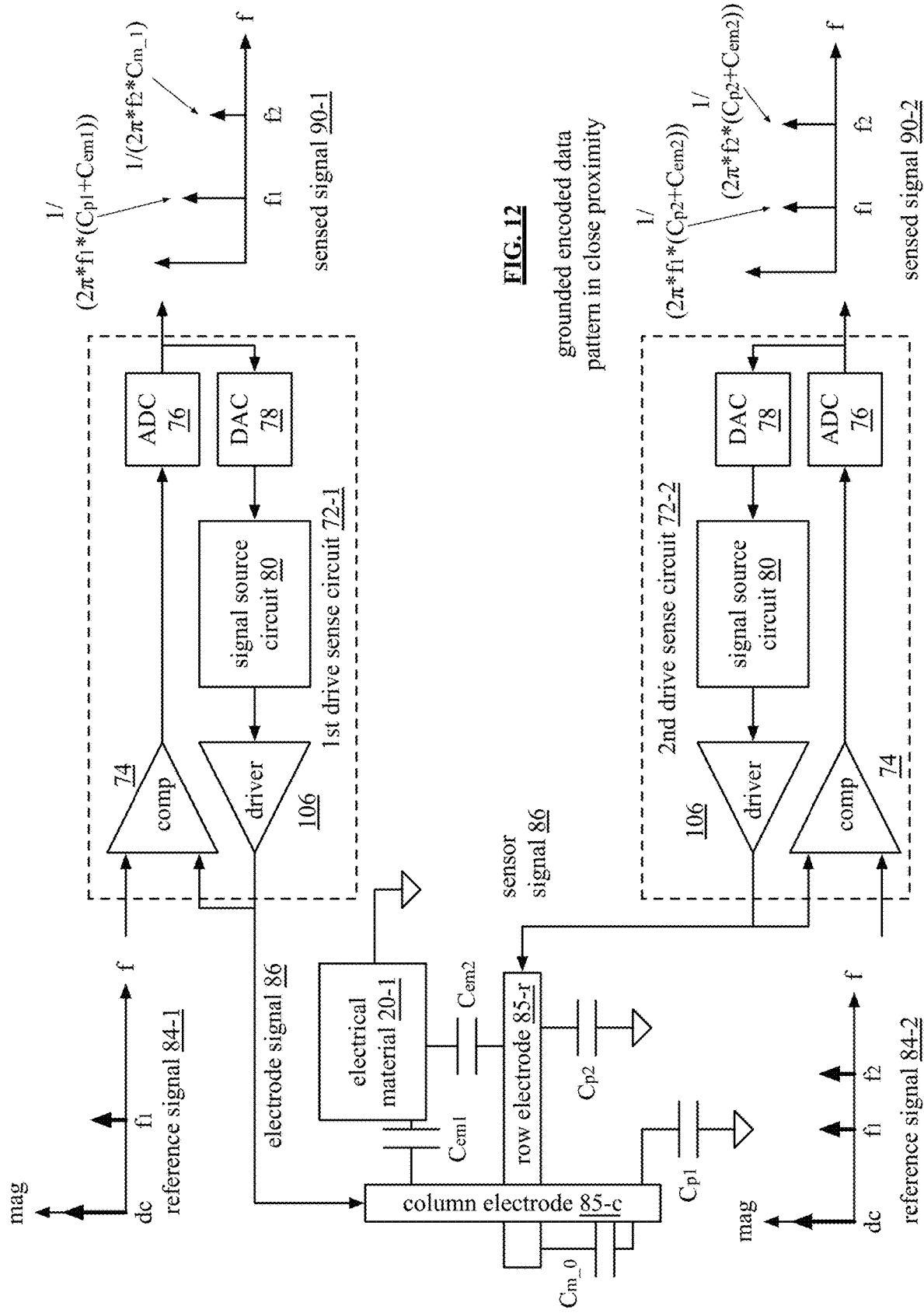
FIG. 12 is a schematic block diagram of an example of a first drive sense circuit coupled to a first electrode and a second drive sense circuit coupled to a second electrode in accordance with the present invention.

FIG. 12 is a schematic block diagram of an example of a first drive sense circuit 72-1 coupled to a first electrode 85-c and a second drive sense circuit 72-2 coupled to a second electrode 85-r with a grounded encoded data pattern in close proximity. This example is similar to the one of FIG. 11 with the difference being a grounded electrical material 20-1 proximal to the electrodes. With a grounded electrical material 20-1 proximal to the electrodes, the self-capacitance and the mutual capacitance of the electrodes are changed. With an ungrounded electrical material 20-1 proximal to the electrodes, only the mutual capacitance of the electrodes are changed.

In this example, the impedance of the self-capacitance at $f_1$ of the column electrode 85-c now includes the effect of the electrical material 20-1 capacitance (e.g., $C_{em1}$). As such, the impedance of the self-capacitance of the column electrode equals $1/(2\pi f_1 *(C_{p1}+C_{em1}))$, which is included the sensed signal 90-1. The second frequency component at $f_2$ corresponds to the impedance of the mutual-capacitance at $f_2$, which includes the effect of the electrical material 20-1 capacitance. As such, the impedance of the mutual capacitance equals $1/(2\pi f_2 C_{m\_1})$, where $C_{m\_1}=(C_{m\_0}*(C_{em1})/(C_{m\_0}+C_{em1})$.

Continuing with this example, the first frequency component at $f_1$ of the second sensed signal 90-2 corresponds to the impedance of the shielded self-capacitance of the row electrode 85-r at $f_1$, which is affected by the electrical material 20-1 capacitance (e.g., $C_{em2}$). As such, the impedance of the capacitance of the row electrode 85-r equals $1/(2\pi f_1 *(C_{p2}+C_{em2}))$. The second frequency component at $f_2$ of the second sensed signal 90-2 corresponds to the impedance of the unshielded self-capacitance at $f_2$, which includes the effect of the electrical material 20-1 capacitance (e.g., $C_{em2}$) and is equal to $1/(2\pi f_2 *(C_{p2}+C_{em2}))$.

Figure 13:
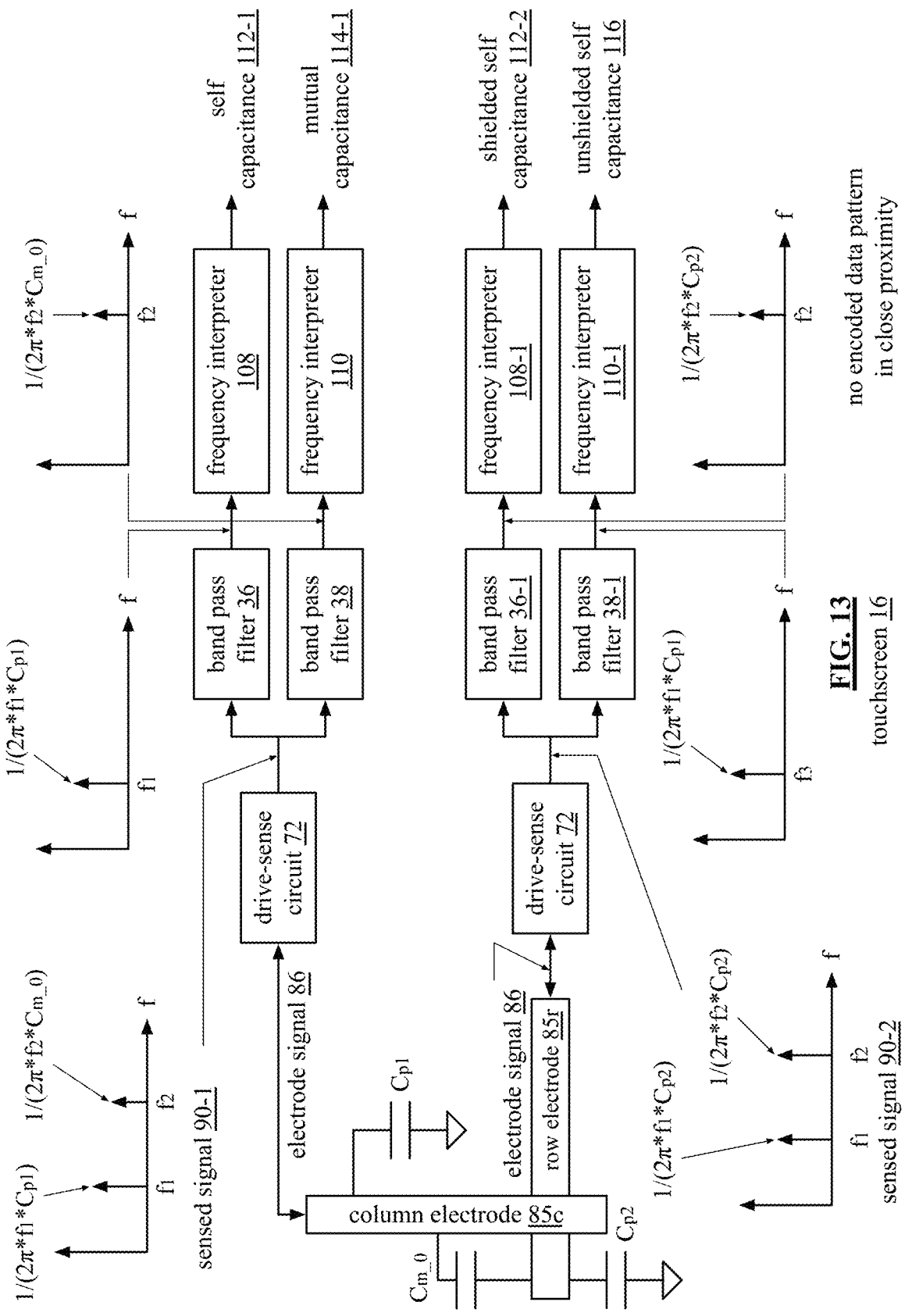
FIG. 13 is a schematic block diagram of a few drive sense circuits and a portion of the touch screen processing module of a touch screen in accordance with the present invention.

FIG. 13 is a schematic block diagram of a few drive sense circuits 72 and a portion of the touch screen processing module 82 of a touch screen 16 not in close proximity to an encoded data pattern. The portion of the processing module 82 includes band pass filters 36, 38, 36-1, & 38-2 and frequency interpreters 108, 110, 108-1 & 110-1. As previously discussed, a first drive sense circuit is coupled to column electrode 85c and a second drive sense circuit is coupled to a row electrode 85r.

The drive sense circuits provide electrode signals 86 to their respective electrodes 85 and produce therefrom respective sensed signals 90. The first sensed signal 90-1 includes a first frequency component at $f_1$ that corresponds to the self-capacitance of the column electrode 85c and a second frequency component at $f_2$ that corresponds to the mutual capacitance of the column electrode 85c. The second sensed signal 90-2 includes a first frequency component at $f_1$ that corresponds to the shielded self-capacitance of the row electrode 85r and/or a second frequency component at $f_2$ that corresponds to the unshielded self-capacitance of the row electrode 85r. In an embodiment, the sensed signals 90 are frequency domain digital signals.

The first bandpass filter 36 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 36 passes the portion of the sensed signal 90-1 that corresponds to the self-capacitance of the column electrode 85c. In an embodiment, the sensed signal 90-1 is a digital signal, thus, the first bandpass filter 36 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 108 receives the first bandpass filter sensed signal and interprets it to render a self-capacitance value 112-1 for the column electrode. As an example, the frequency interpreter 108 is a processing module, or portion thereof, that executes a function to convert the first bandpass filter sensed signal into the self-capacitance value 112-1, which is an actual capacitance value, a relative capacitance value (e.g., in a range of 0-100), or a difference capacitance value (e.g., is the difference between a default capacitance value and a sensed capacitance value). As another example, the frequency interpreter 108 is a look up table where the first bandpass filter sensed signal is an index for the table.

The second bandpass filter 38 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 38 passes the portion of the sensed signal 90-1 that corresponds to the mutual-capacitance of the column electrode 85c and the row electrode 85r. In an embodiment, the sensed signal 90-1 is a digital signal, thus, the second bandpass filter 38 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 110 receives the second bandpass filter sensed signal and interprets it to render a mutual-capacitance value 114-1. As an example, the frequency interpreter 110 is a processing module, or portion thereof, that executes a function to convert the second bandpass filter sensed signal into the mutual-capacitance value 114-1, which is an actual capacitance value, a relative capacitance value (e.g., in a range of 0-100), and/or a difference capacitance value (e.g., is the difference between a default capacitance value and a sensed capacitance value). As another example, the frequency interpreter 38 is a look up table where the first bandpass filter sensed signal is an index for the table.

For the row electrode 85r, the drive-sense circuit 72 produces a second sensed signal 90-2, which includes a shielded self-capacitance component and/or an unshielded self-capacitance component. The third bandpass filter 36-1 is similar to the first bandpass filter 36 and, as such passes signals in a bandpass region centered about frequency $f_1$ and attenuates signals outside of the bandpass region. In this example, the third bandpass filter 36-1 passes the portion of the second sensed signal 90-2 that corresponds to the shielded self-capacitance of the row electrode 85r.

The frequency interpreter 108-1 receives the second bandpass filter sensed signal and interprets it to render a second and shielded self-capacitance value 112-2 for the row electrode. The frequency interpreter 108-1 may be implemented similarly to the first frequency interpreter 108 or an integrated portion thereof. In an embodiment, the second self-capacitance value 112-2 is an actual capacitance value, a relative capacitance value (e.g., in a range of 0-100), or a difference capacitance value (e.g., is the difference between a default capacitance value and a sensed capacitance value).

The fourth bandpass filter 38-1, if included, is similar to the second bandpass filter 38. As such, it passes, substantially unattenuated, signals in a bandpass region centered about frequency $f_2$ and attenuates signals outside of the bandpass region. In this example, the fourth bandpass filter 38-2 passes the portion of the second sensed signal 90-2 that corresponds to the unshielded self-capacitance of the row electrode 85r.

The frequency interpreter 110-1, if included, receives the fourth bandpass filter sensed signal and interprets it to render an unshielded self-capacitance value 116. The frequency interpreter 38-1 may be implemented similarly to the frequency interpreter 116 or an integrated portion thereof. In an embodiment, the unshielded self-capacitance value 116 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 38-1 and frequency interpreter 110-1 may be omitted.

Figure 14:
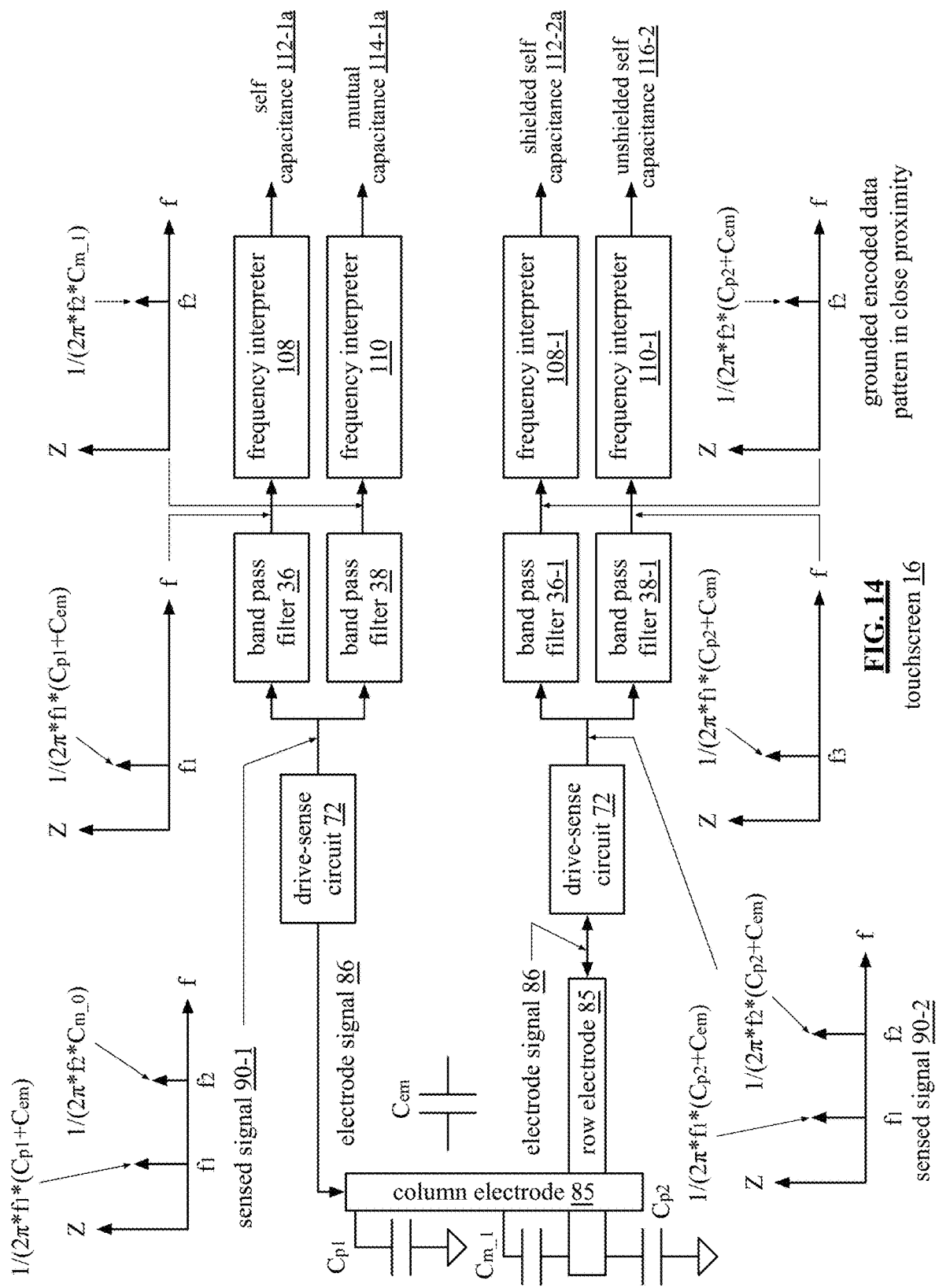
FIG. 14 is a schematic block diagram of a few drive sense circuits and a portion of the touch screen processing module of a touch screen in accordance with the present invention.

FIG. 14 is a schematic block diagram of a few drive sense circuits and a portion of the touch screen processing module of a touch screen 16 that is similar to FIG. 13, with the difference being a grounded encoded data pattern is in close proximity as represented by the capacitance $C_{em}$ of the electrical material. In this example, the self-capacitance and mutual capacitance of each electrode is affected by the electrical material capacitance.

The effected self-capacitance of the column electrode 85c is processed by the first bandpass filter 36 and the frequency interpreter 108 to produce a self-capacitance value 112-1a. The mutual capacitance of the column electrode 85c and row electrode is processed by the second bandpass filter 38 and the frequency interpreter 110 to produce a mutual-capacitance value 114-1a.

The effected shielded self-capacitance of the row electrode 85r is processed by the third bandpass filter 36-1 and the frequency interpreter 108-1 to produce a self-capacitance value 112-2a. The effected unshielded self-capacitance of the row electrode 85r is processed by the fourth bandpass filter 38-1 and the frequency interpreter 110-1 to produce an unshielded self-capacitance value 116-2.

Figure 15:
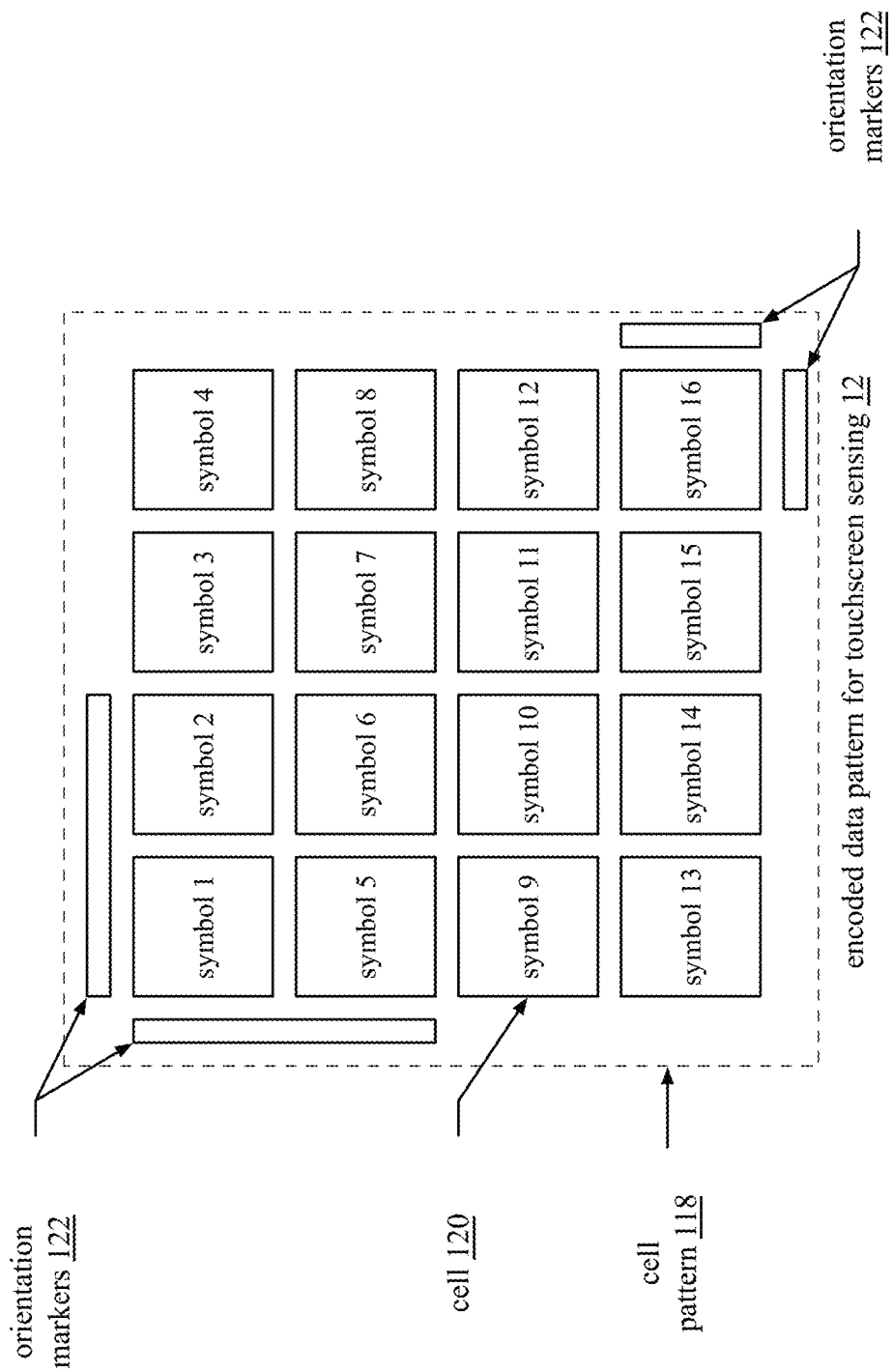
FIG. 15 is a schematic block diagram of an embodiment of an encoded data pattern for touchscreen sensing in accordance with the present invention.

FIG. 15 is a schematic block diagram of an embodiment of an encoded data pattern for touchscreen sensing ("encoded data pattern") 12 that includes a cell pattern 118. The cell pattern 118 includes cells 120 and orientation markers 122. The cells 120 and orientation markers 122 are created using electrical materials. For example, the cell pattern 118 is printed with doped ink(s) having varying conductive and/or dielectric properties.

The cells 120 include data to be interpreted. Each cell 120 includes a symbol (e.g., symbols 1-16) representative of data. The size of each cell can vary depending on application of encoded data pattern and the resolution of the encoded data sensing computing device 14's touchscreen. For example, with a high resolution touchscreen, a cell size could be in the order of microns with the entire encoded data pattern measuring in the millimeter range. For lower resolutions, a cell size could measure in the millimeter range with the entire encoded data pattern measuring in the centimeter range.

The orientation markers 122 assist in the correct interpretation of the cell pattern (e.g., the order in which the symbols should be read and interpreted). The orientation markers 122 may be of a different size, shape, and/or material than the cells 120 to distinguish the orientation markers 122 from the cells 120.

In this example, the cell pattern 118 includes orientation markers 124 on the top left and bottom right of the cell pattern and four rows of four cells (e.g., 16 symbols total). The slightly longer orientation markers 122 on the top left may indicate a starting point in which to begin reading the symbols and the slightly shorter orientation markers 122 at the bottom right may indicate an ending point.

In an example where 4 different materials having different electrical properties are used to create the symbols, there are 328 symbol options per cell (e.g., 26 upper case letter+26 lower case letter+20 special characters+10 digit options=82 options*4 different materials=328). With the example of 16 cells, 328^16=1.8*10e40 symbol combinations are possible. In other embodiments, more or less materials and/or cells can be used to produce a variety of symbol combination options.

Figure 16:
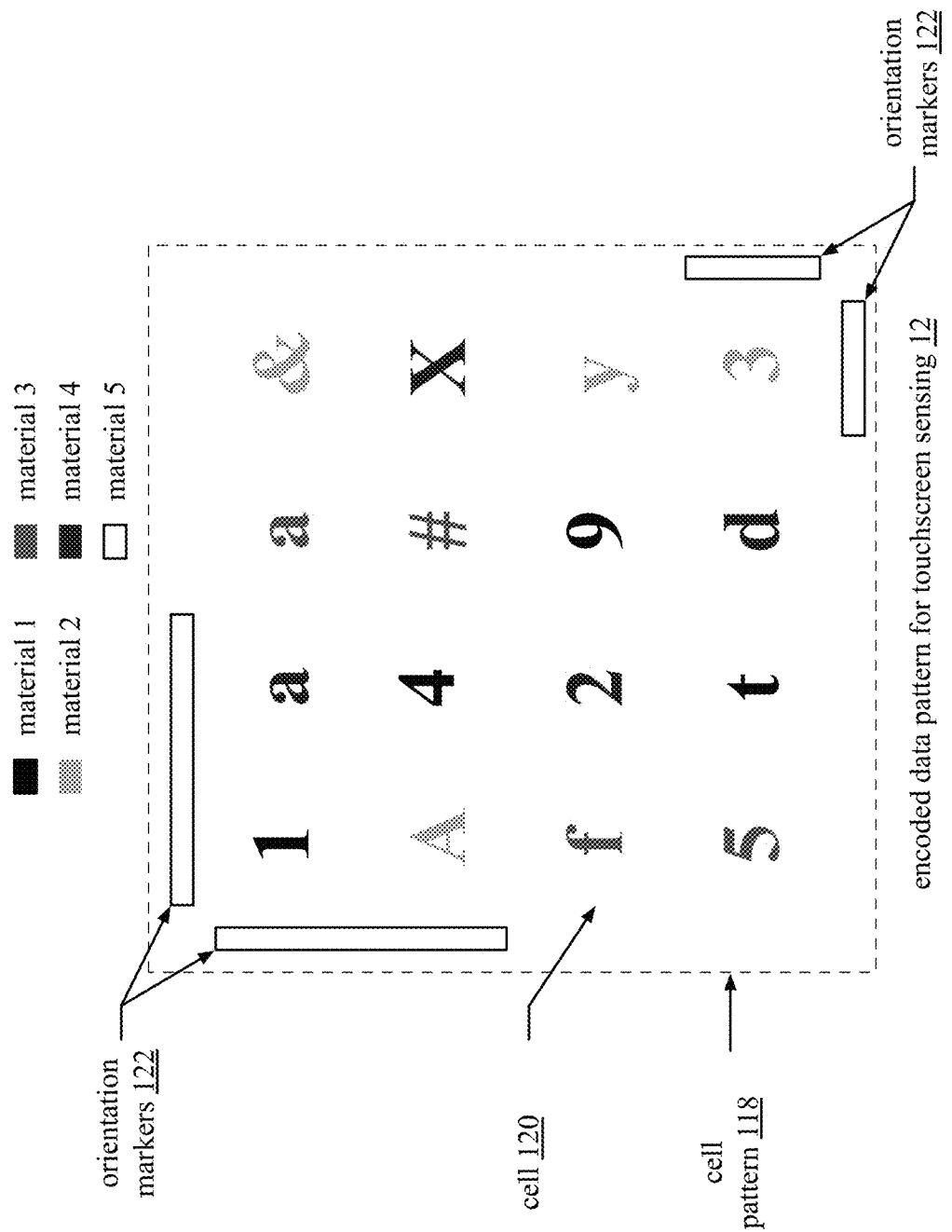
FIG. 16 is a schematic block diagram of an embodiment of an encoded data pattern for touchscreen sensing in accordance with the present invention.

FIG. 16 is a schematic block diagram of an embodiment of an encoded data pattern for touchscreen sensing 12 that includes a cell pattern 118. FIG. 16 is a more specific example of FIG. 15 where 4 different materials having different electrical properties are used to create symbols in each cell and a fifth material is used for the orientation markers 122.

In this example, the symbols are letters, numbers, and special characters. With four different materials, each symbol has four different possible meanings. Therefore, in this example, the code reads "1aa&A4#Xf29y5td3" but the material of each symbol is also identified in the coded information based on the effect it has on the touchscreen's electrodes. For example, the lower case "a" in material 3 has a different meaning that the lower case "a" in material 4. As such, many symbol combinations are possible in a small amount of area.

Figure 17:
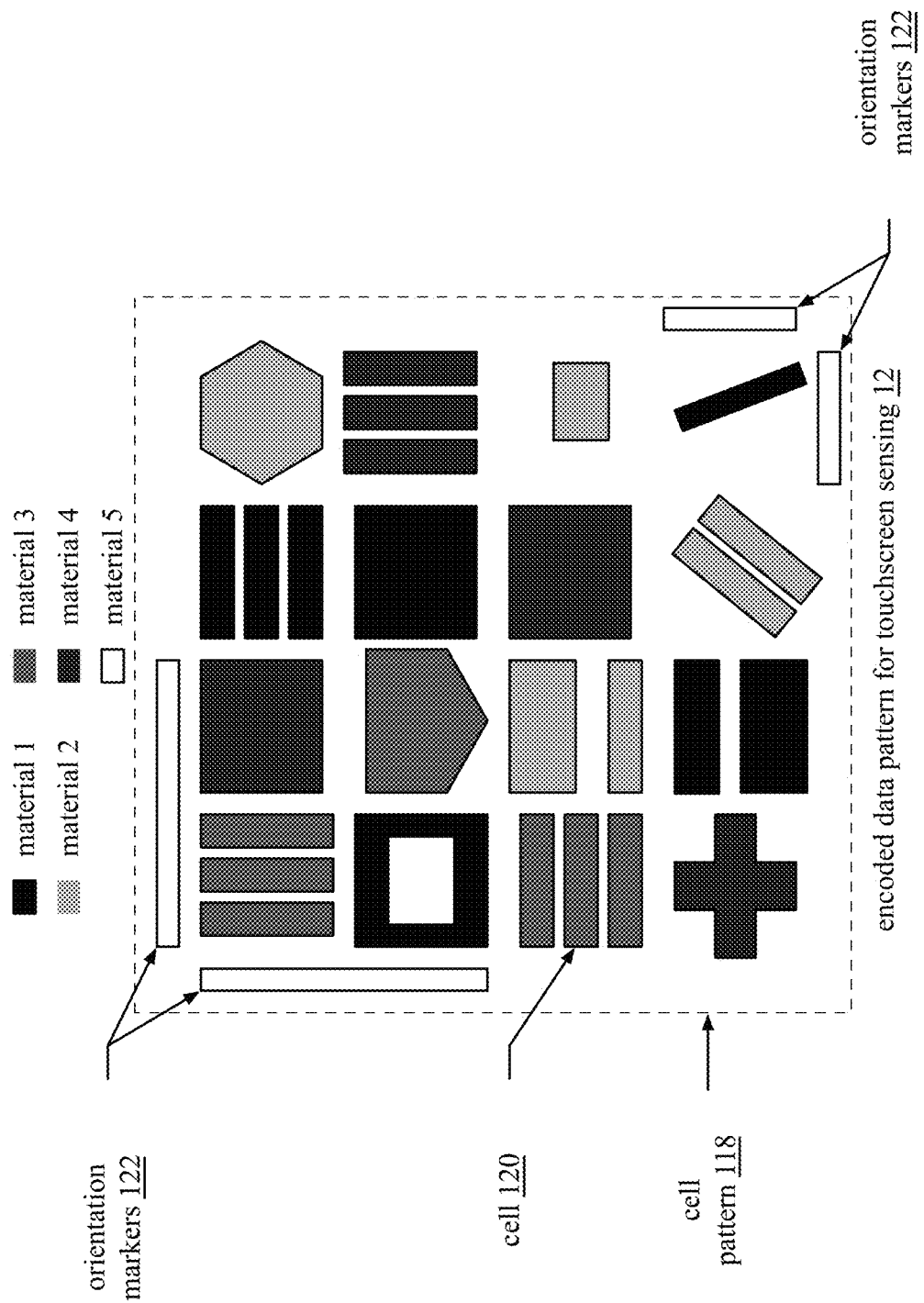
FIG. 17 is a schematic block diagram of an embodiment of an encoded data pattern for touchscreen sensing in accordance with the present invention.

FIG. 17 is a schematic block diagram of an embodiment of an encoded data pattern for touchscreen sensing 12 that includes a cell pattern 118. FIG. 17 is similar to FIG. 16 except that a coded graphical scheme is used to represent alphanumeric and special characters. The coded graphical scheme may be done using shapes that are easier for the touchscreen to sense than the letters, numbers, and special characters themselves. For example, sensing a number "1" requires a higher resolution than a square because, depending on the size of the symbol, the square likely affects more electrodes in the touchscreen.

Additional materials reduce the number of unique symbols required. For example, a square in 16 different materials could represent 16 unique symbols. With a coded graphical scheme, the touchscreen processing module includes an additional feature of decoding the detected shapes to determine the alphanumeric sequence they represent.

Figure 18:
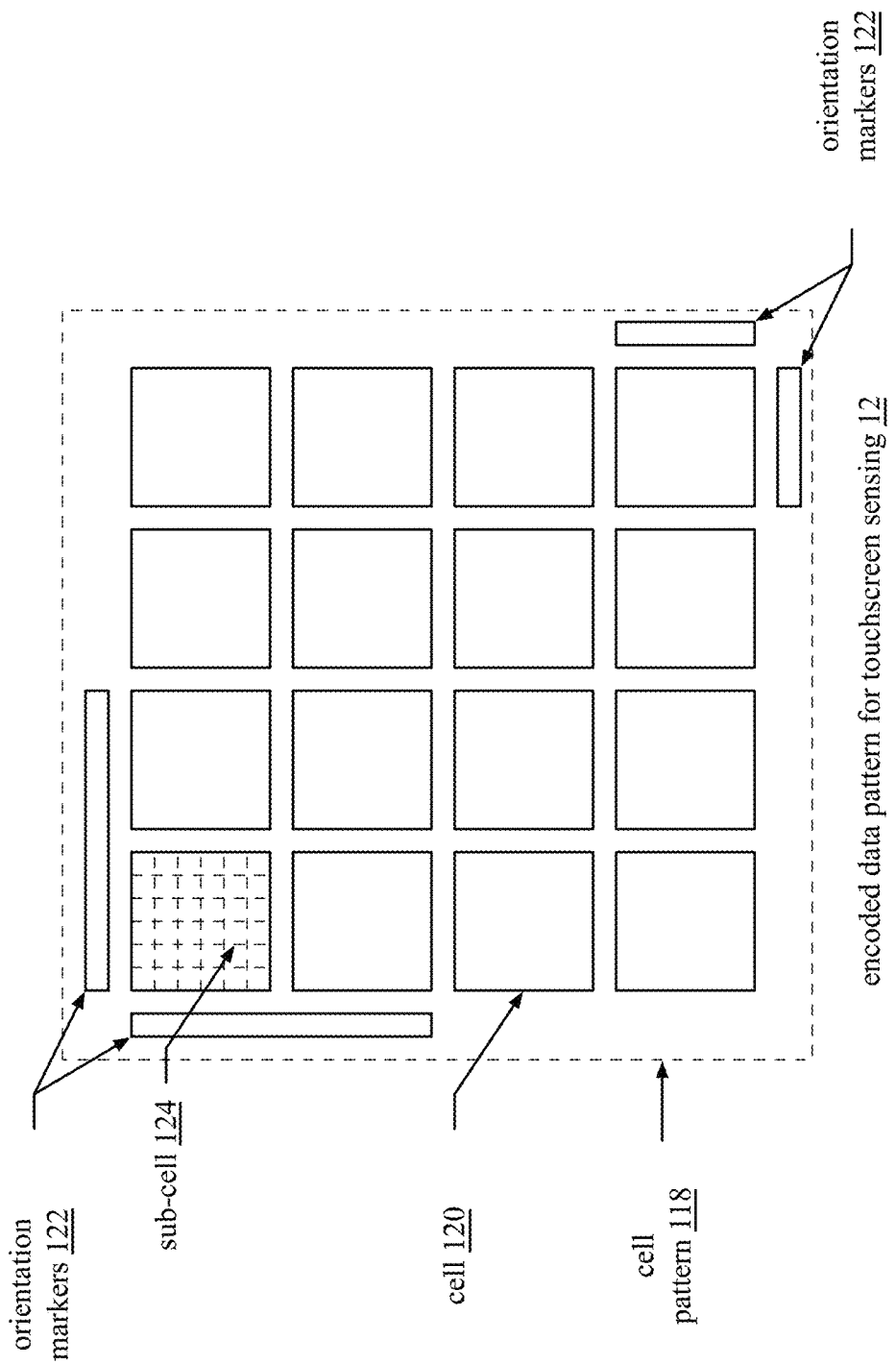
FIG. 18 is a schematic block diagram of an embodiment of an encoded data pattern for touchscreen sensing in accordance with the present invention.

FIG. 18 is a schematic block diagram of an embodiment of an encoded data pattern for touchscreen sensing 12 that includes a cell pattern 118. FIG. 18 is similar to the example of FIG. 15 except that the cells 120 include sub-cells 124.

The arrangement and composition of the sub-cells 124 within a cell 120 is representative of a symbol. As an example, a cell 120 includes 6×6 sub cells providing 36 total sub-cells per cell. When 4 different materials are used, there are $36^4=1,679,616$ pattern options per cell. With 16 total cells, there are 4.0×10e99 possible symbol combinations (e.g., $1,679,616^{16}=4.0\times10e99$).

Figure 19:
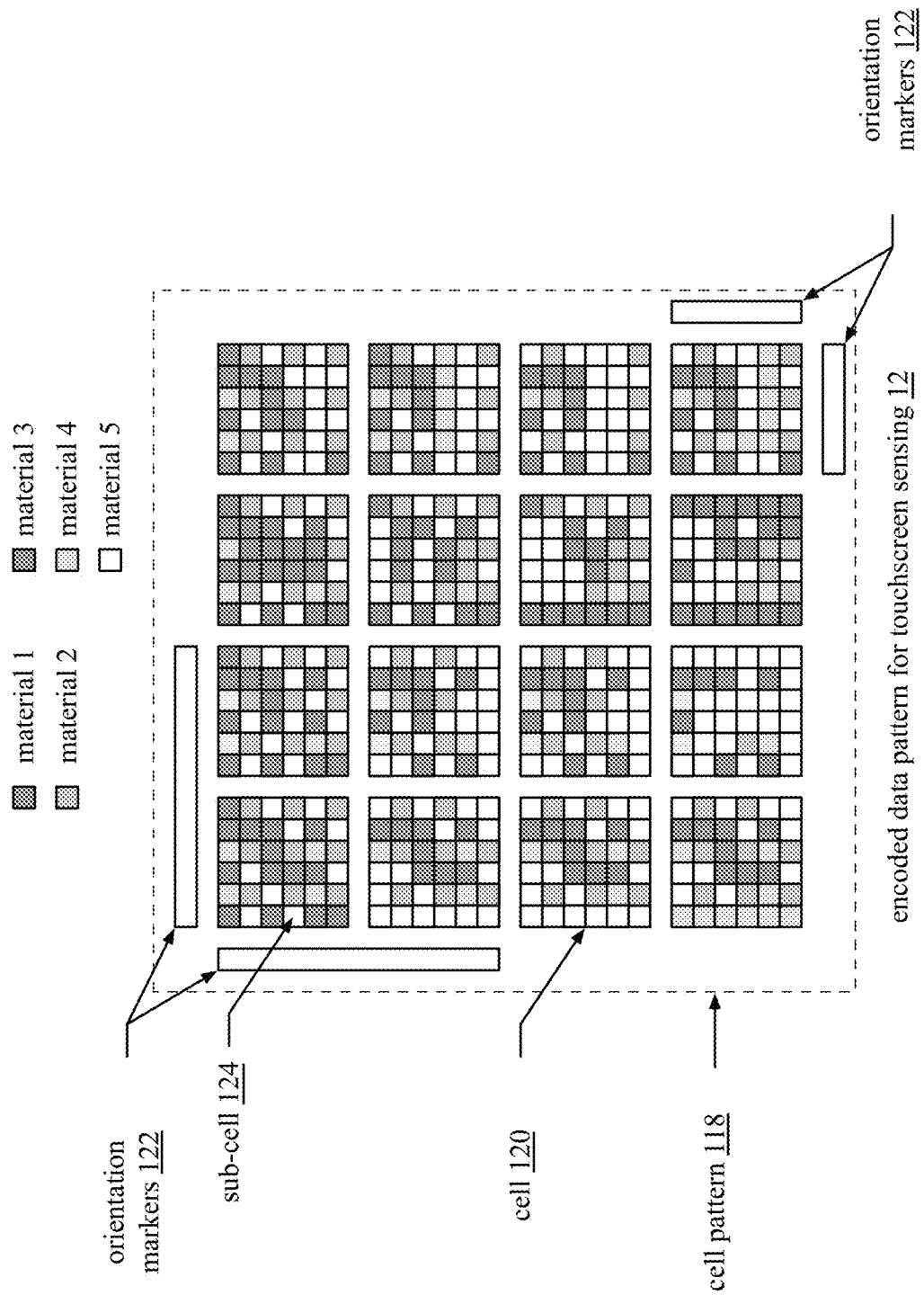
FIG. 19 is a schematic block diagram of an embodiment of an encoded data pattern for touchscreen sensing in accordance with the present invention.

FIG. 19 is a schematic block diagram of an embodiment of an encoded data pattern for touchscreen sensing 12 that includes a cell pattern 118. FIG. 19 illustrates an example of the cell pattern described in FIG. 18 where the cells 120 include sub-cells 124. The arrangement and composition of the sub-cells 124 within a cell 120 is representative of a symbol. The cells 120 includes 6×6 sub cells and 5 different materials are used in each cell 120.

Figure 20:
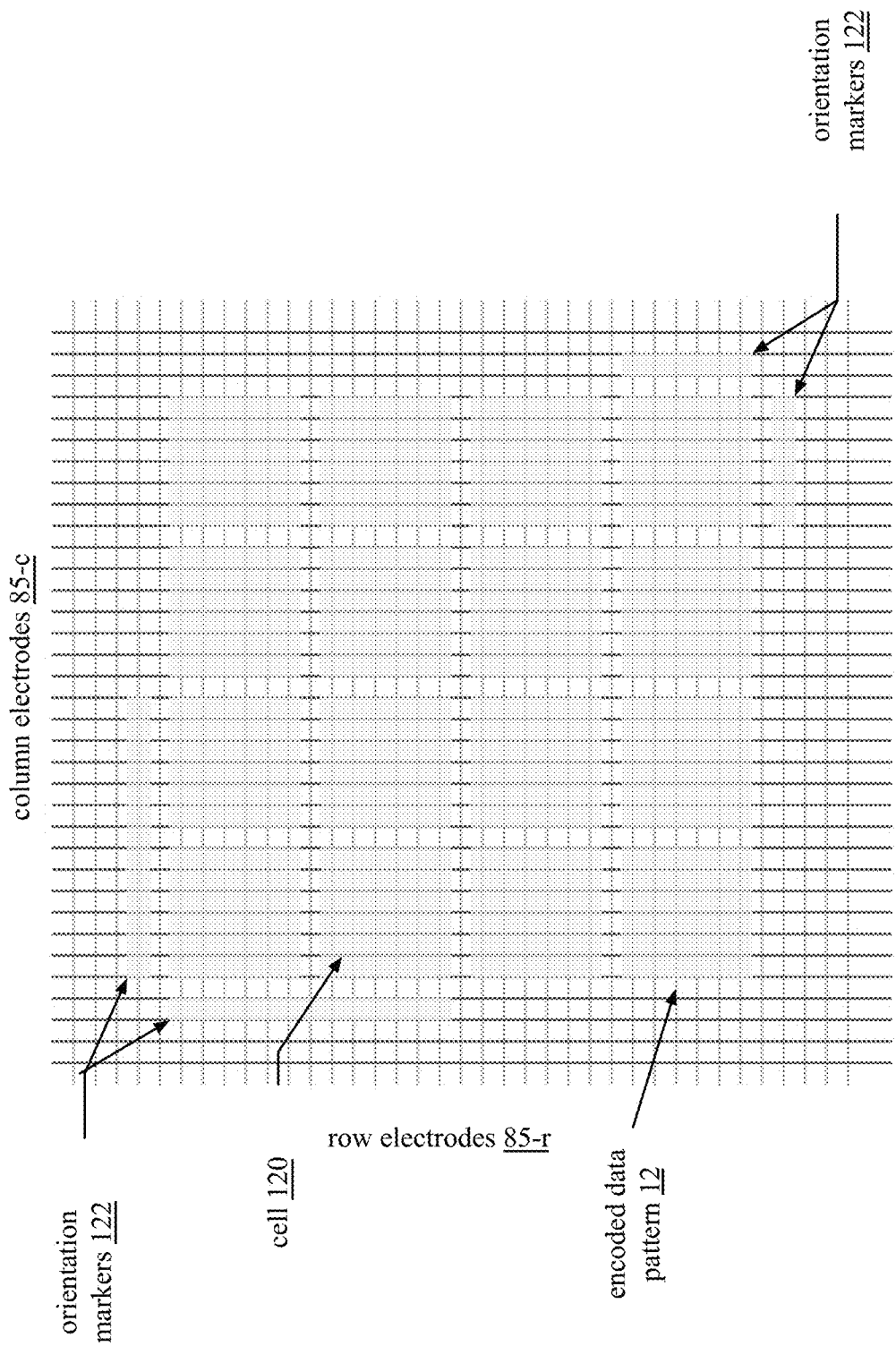
FIG. 20 is a schematic block diagram of an embodiment of a grid of electrodes of a touchscreen in accordance with the present invention.

FIG. 20 is a schematic block diagram of an embodiment of a grid of electrodes of a touchscreen. The grid of electrodes includes column electrodes 85-$c$ in red and row electrodes 85-$r$ in blue. The encoded data pattern 12 discussed in FIGS. 15-19 is shown on top of the electrode grid in yellow to demonstrate the resolution requirements of the touchscreen.

For example, when a cell 120 of the encoded data pattern 12 includes a symbol similar to the example of FIG. 17 (e.g., a square covering multiple electrodes), the resolution shown is likely sufficient to detect and interpret the encoded data pattern. However, with the examples of FIG. 16 and FIGS. 18-19, greater resolution is likely needed.

Figure 21:
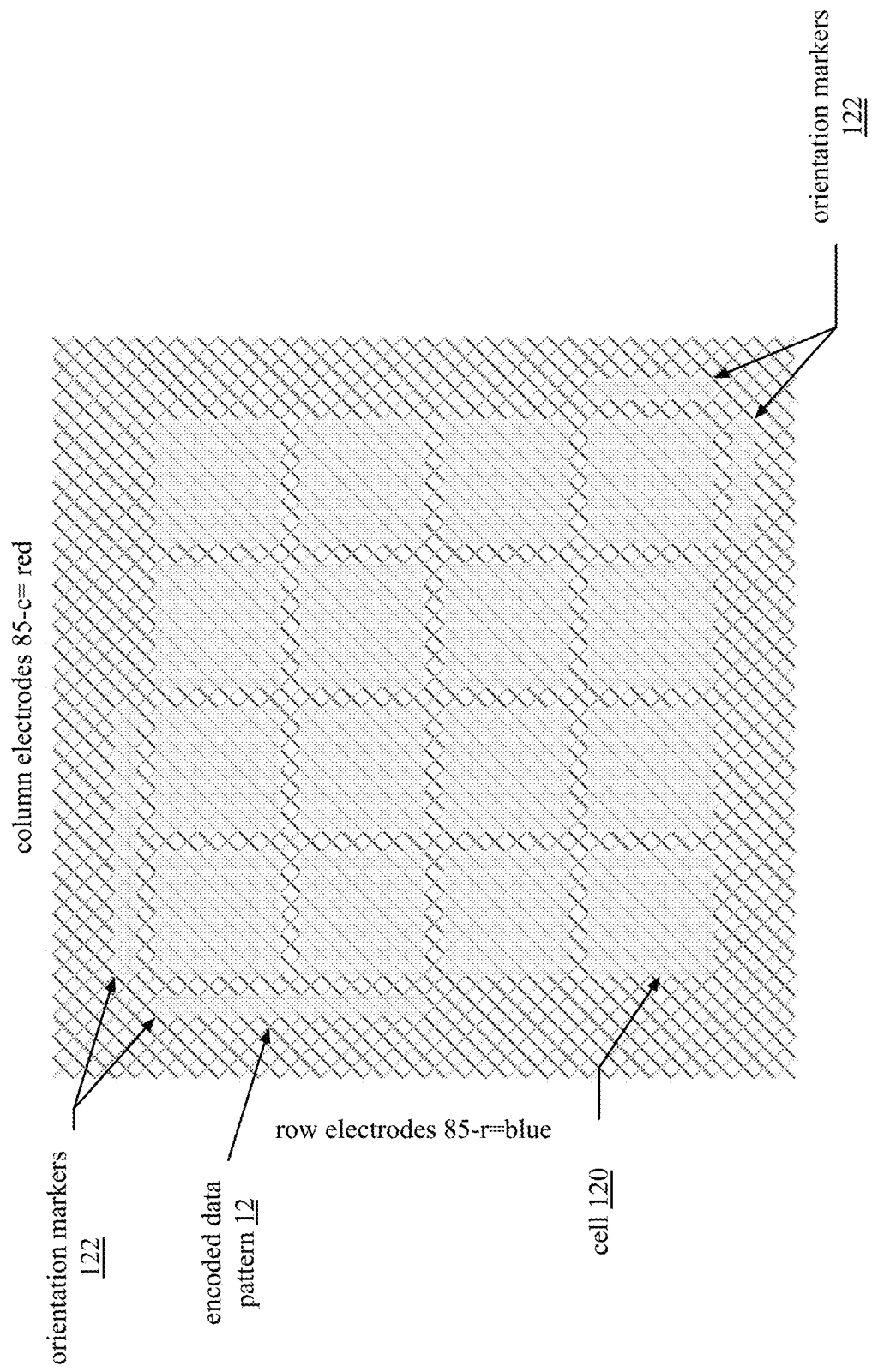
FIG. 21 is a schematic block diagram of an embodiment of a grid of electrodes of a touchscreen in accordance with the present invention.

FIG. 21 is a schematic block diagram of an embodiment of a grid of electrodes of a touchscreen. The grid of electrodes includes diagonal column electrodes 85-$c$ in red and diagonal row electrodes 85-$r$ in blue. As compared to the example of FIG. 20, the diagonal arrangement of electrodes increases the resolution of the touchscreen because more electrodes are affected per cell 120 of the encoded data pattern 12.

Figure 22:
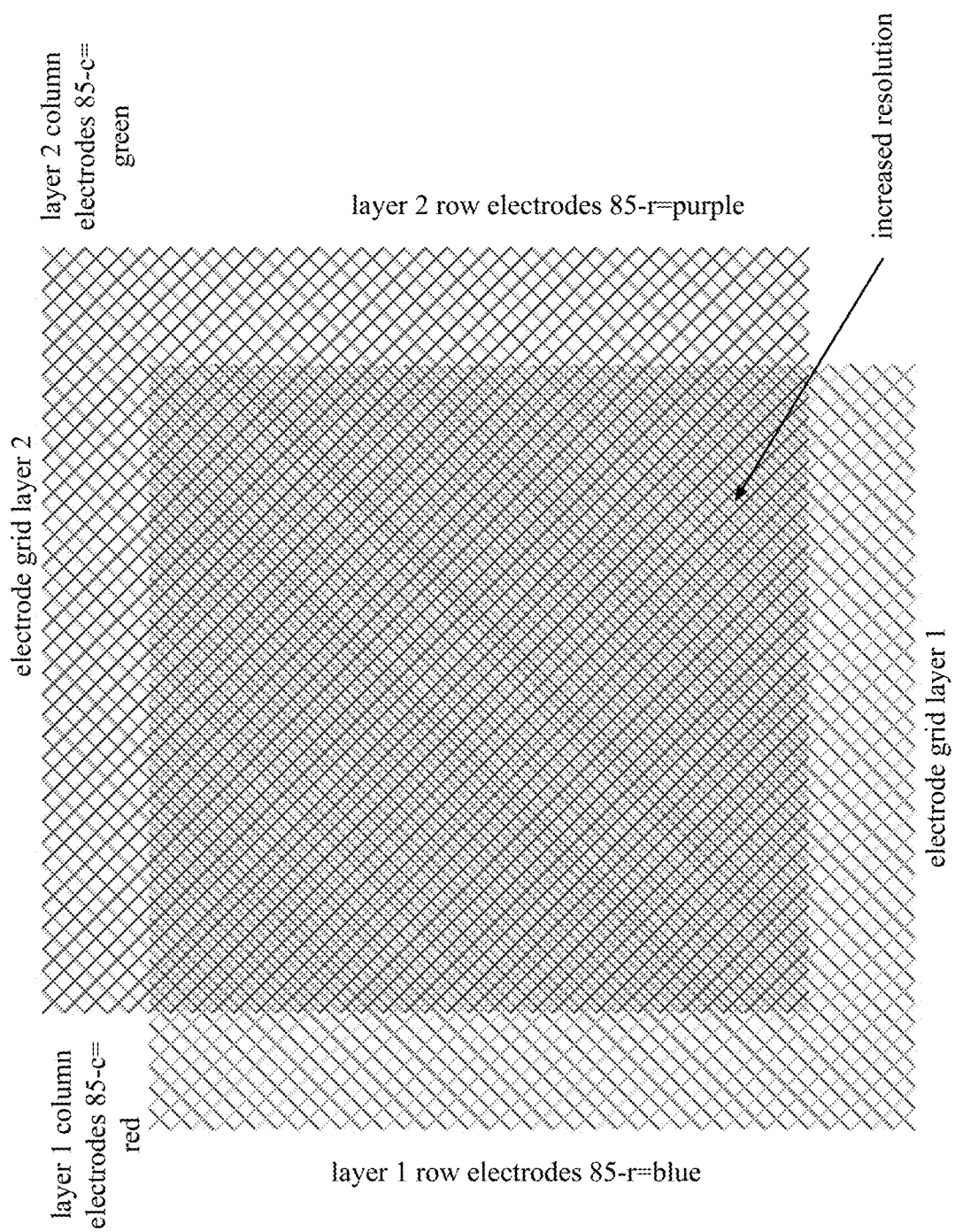
FIG. 22 is a schematic block diagram of an embodiment of multiple electrode grid layers of a touchscreen in accordance with the present invention.

FIG. 22 is a schematic block diagram of an embodiment of multiple electrode grid layers of a touchscreen. A first electrode grid layer (e.g., electrode grid layer 1) includes diagonal column electrodes 85-$c$ in red and diagonal row electrodes 85-$r$ in blue similar to the example of FIG. 21.

A second electrode grid layer (e.g., electrode grid layer 2) includes diagonal column electrodes 85-$c$ in green and diagonal row electrodes 85-$r$ in purple. Layering electrode grid layer 2 and electrode grid layer 1 increases the resolution of the touchscreen. While two layers of diagonal electrode patterns are shown, multiple layers and multiple electrode patterns are possible. Increased resolution allows for very accurate sensing of encoded data patterns of varying sizes in close proximity to the touchscreen.

Figure 23:
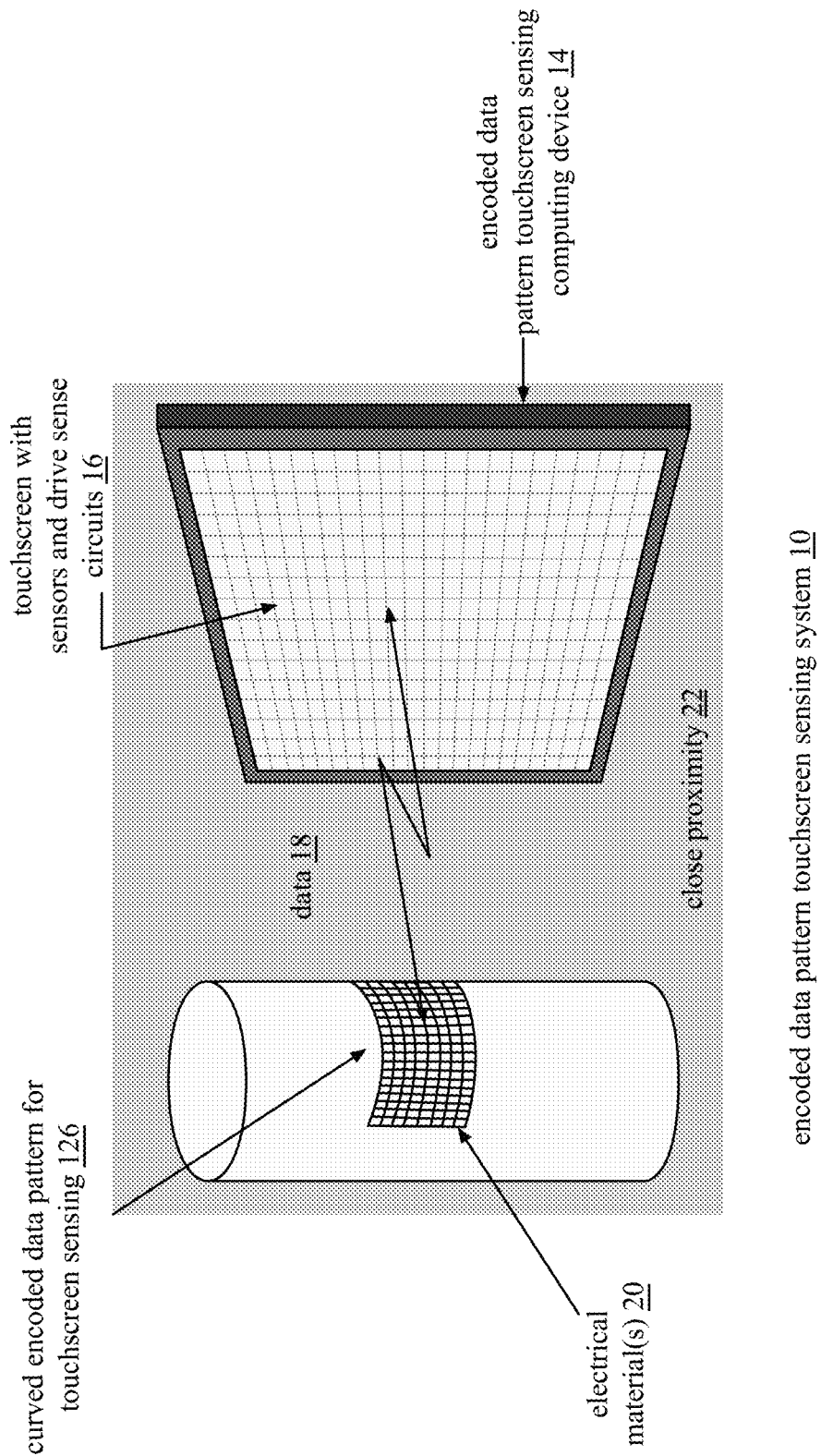
FIG. 23 is a schematic block diagram of an embodiment of an encoded data pattern touchscreen sensing system in accordance with the present invention.

FIG. 23 is a schematic block diagram of an embodiment of an encoded data pattern touchscreen sensing system 10 that includes a curved encoded data pattern for touchscreen sensing ("curved encoded data pattern") 126 and an encoded data pattern touchscreen sensing computing device 14. FIG. 23 operates similarly to FIG. 1 except that the encoded data pattern of FIG. 23 is curved. The curved encoded data pattern 126 is curved because it has been affixed to a curved surface. For example, the curved encoded data pattern 126 is a barcode on a cylindrical product.

The curved encoded data pattern 126 presents sensing challenges since the curvature puts some portions of the curved encoded data pattern 126 further from the surface of the touchscreen than others. The encoded data pattern touchscreen sensing computing device 14 is operable to adjust for these issues.

FIGS. 24A-24B are schematic block diagrams of embodiments of a touchscreen with sensors and drive sensor circuits ("touchscreen") 16 in close proximity with an encoded data pattern. In FIG. 24A, the touchscreen 16 is in close proximity to a substantially flat encoded data pattern 12 consisting of four electrical materials. For ease of illustration, the encoded data pattern 12 is shown to the left of the touchscreen 16, however close proximity means the encoded data pattern 12 is able to be sensed by the touchscreen 16 surface (e.g., hovering over the touchscreen, placed directly on the touchscreen, etc.). The four electrical materials have different effects on the electrical characteristics of the electrodes of the touchscreen as shown by the shades of gray. The different effects allow the touchscreen to interpret the encoded data pattern and decode the data present.

In FIG. 24B, the touchscreen 16 is in close proximity to a curved encoded data pattern 126 consisting of four electrical materials. The curved encoded data pattern 126 has a curved encoded data pattern shape 134 that curves away from the touchscreen 16 at the left and right edges such that the center portion of the curved encoded data pattern 126 is in closer proximity to the touchscreen 16 than the left and right edges.

With the left and right edges curved away from the touchscreen 16, the intended effect of the electrical materials on the electrical characteristics of the electrodes of the touchscreen 16 is distorted. For example, the effect of material 4 used in the orientation markers is weaker at the left and right edges and has an actual effect closer to the intended effect of material 1 or 2. The effect of material 1 at the left and right edges is weaker and appears closer to the intended effect of material 2. Additionally, because of the curved shape, the outer edges are affecting less area of the touchscreen than in the example of FIG. 24A. The distortions 128 caused by the curved encoded data pattern 126 could result in encoded data pattern reading errors.

Figure 25:
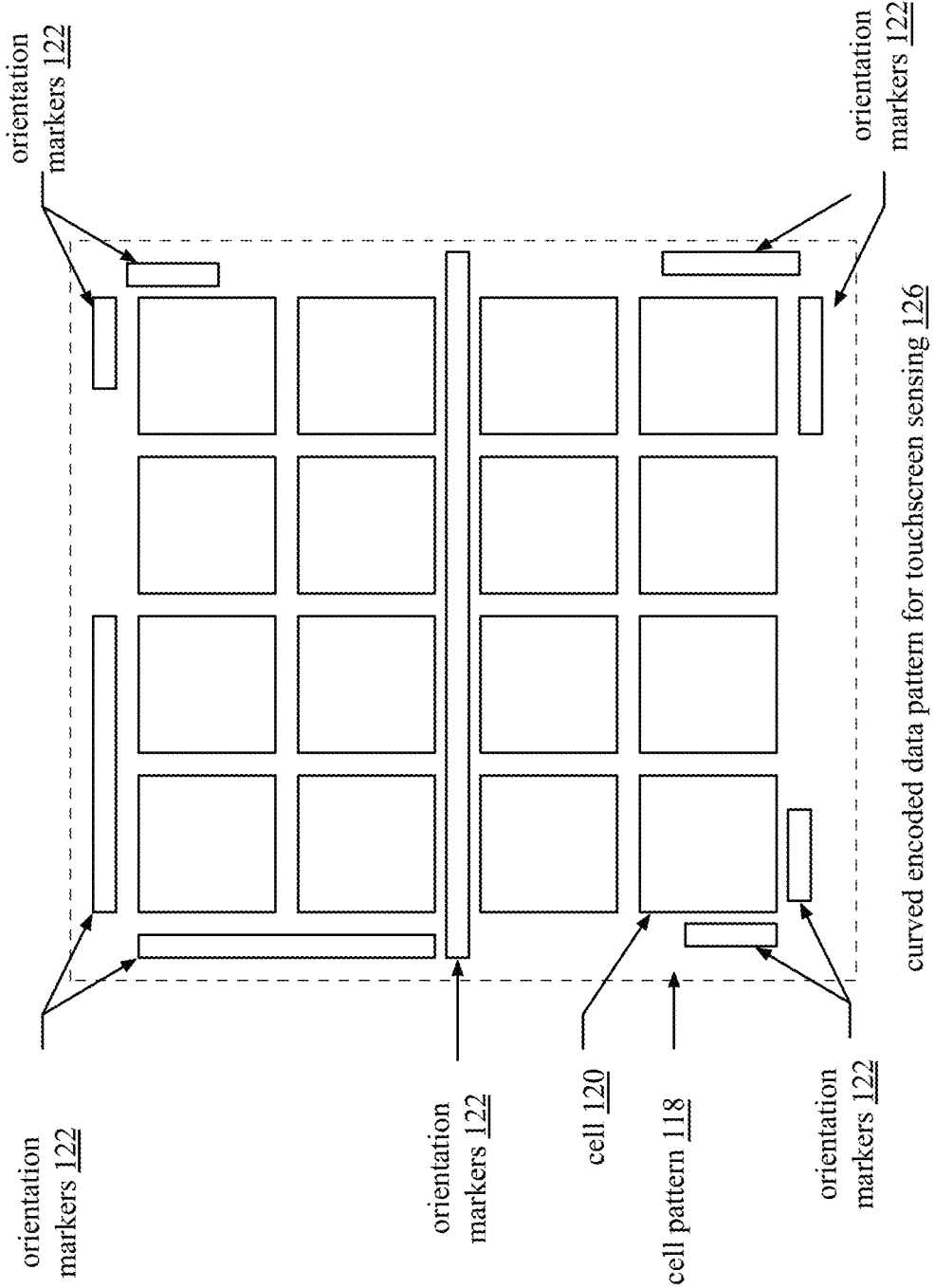
FIG. 25 is a schematic block diagram of an embodiment of a curved encoded data pattern for touchscreen sensing in accordance with the present invention.

FIG. 25 is a schematic block diagram of an embodiment of a curved encoded data pattern for touchscreen sensing ("curved encoded data pattern") 126 that includes a cell pattern 118. The cell pattern 118 includes cells 120 and orientation markers 122. To account for sensing distortion, the curved encoded data pattern 126 includes one or more additional orientation markers 122. The cell pattern 118 includes the same orientation markers 122 included in the non-curved encoded data pattern depicted in FIGS. 15-19 where the top left orientation markers 122 indicate a starting point for reading the encoded data pattern and the bottom left orientation markers 122 indicate an ending point for reading the encoded data pattern.

The cell pattern 118 further includes top right orientation markers 122, bottom left orientation markers 122, and a center orientation marker 122. The additional orientation markers 122 assist the encoded barcode sensing computing device in determining how the barcode is curved in order to adjust for distortions.

Figure 26:
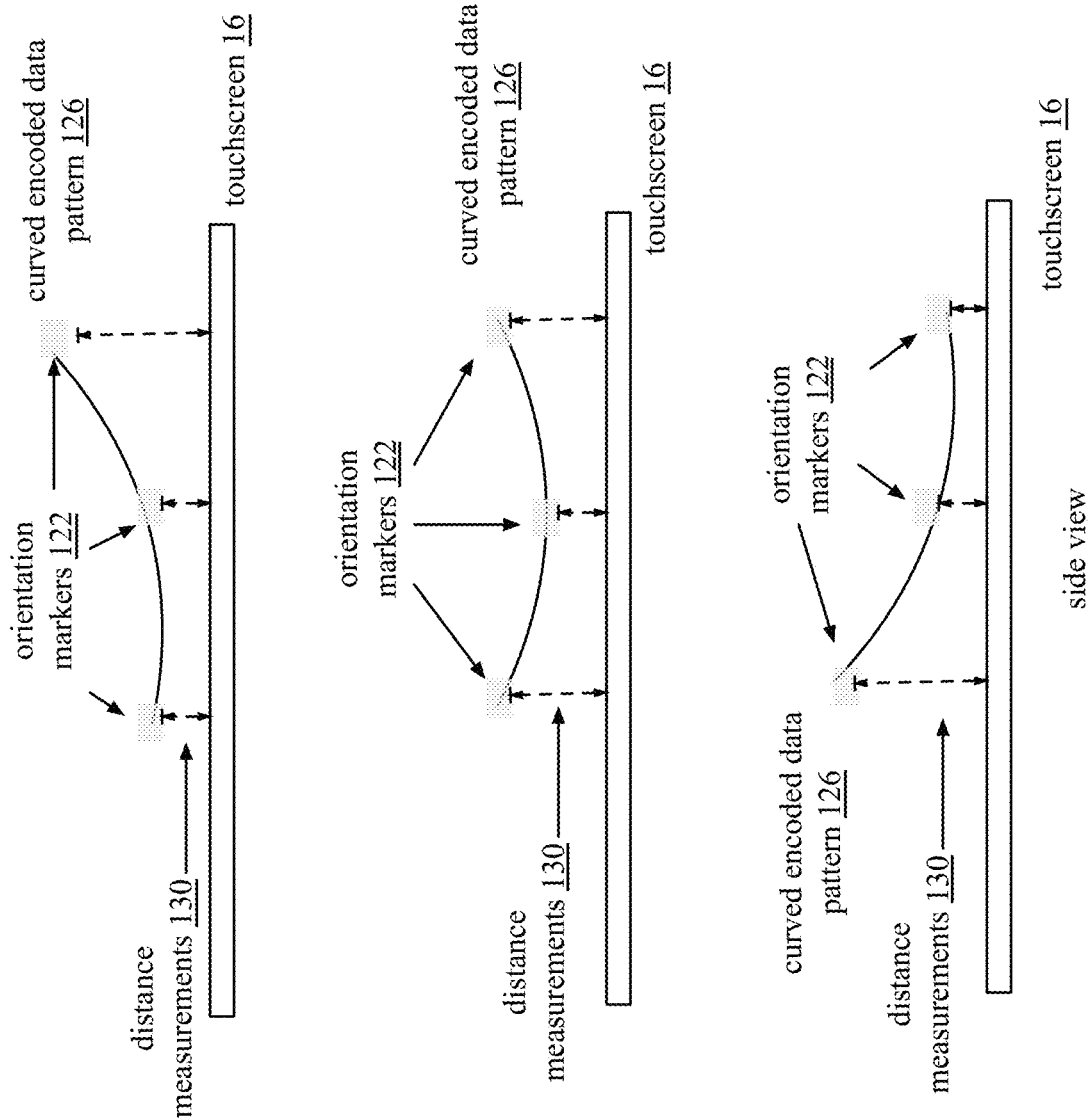
FIG. 26 is a schematic block diagram of side view examples of a curved encoded data pattern in close proximity to a touchscreen in accordance with the present invention.

FIG. 26 is a schematic block diagram of side view examples of a curved encoded data pattern 126 in close proximity to a touchscreen 16. Based on how the encoded data pattern 126 is curved in relationship to the touchscreen 16, the touchscreen 16 will sense the orientation markers 122 differently. However, because of the shape or location of the orientation marker 122 and/or based on the properties of the electrical material used for the orientation markers, the touchscreen 16 is able to identity the orientation markers 122.

Based on the detected effect of the material of the orientation markers 122 compared known intended effects at certain distances, the touchscreen 16 is operable to calculate a distance measurement 130 from the touchscreen 16 surface to the curved encoded data pattern 126.

Figure 27:
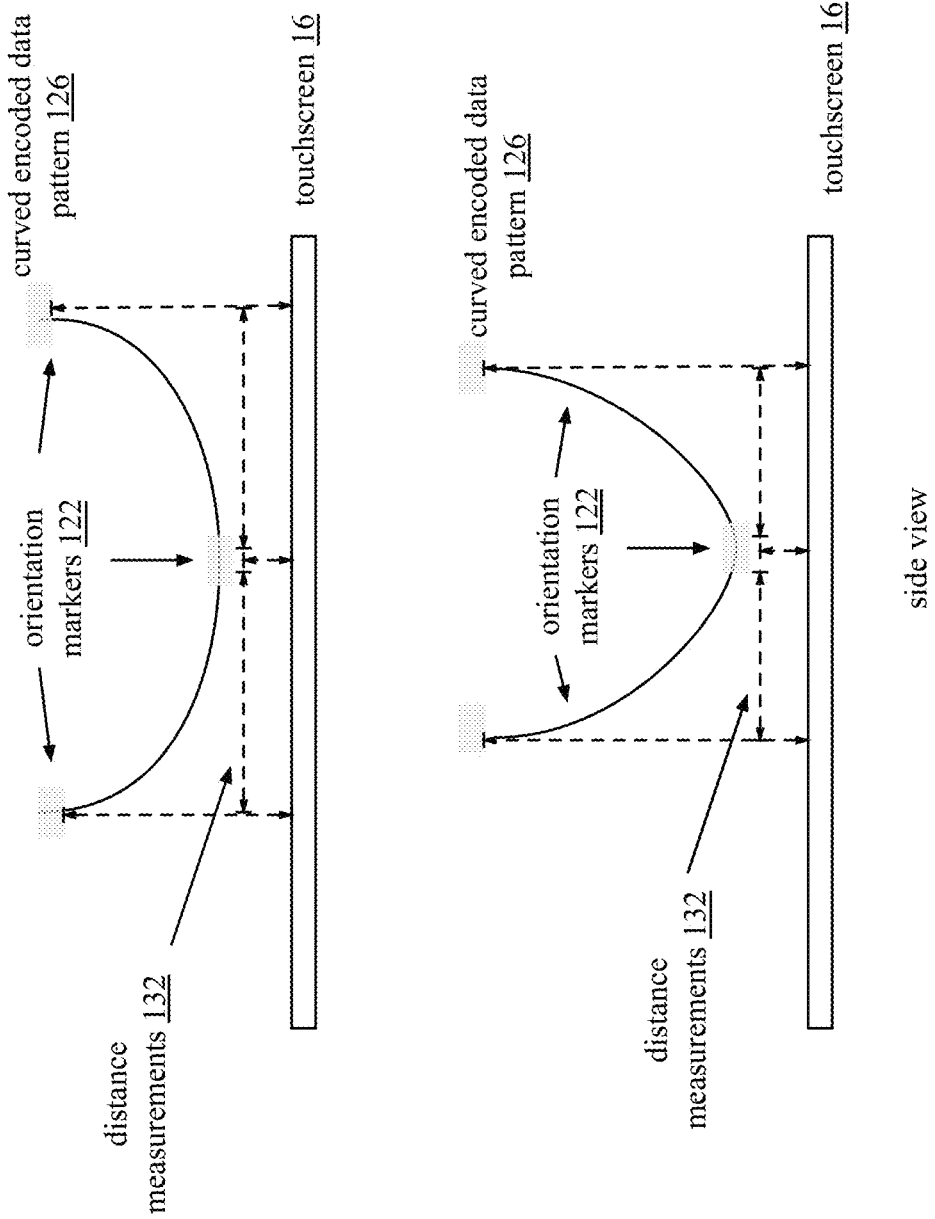
FIG. 27 is a schematic block diagram of side view examples of a curved encoded data pattern in close proximity to a touchscreen in accordance with the present invention.

FIG. 27 is a schematic block diagram of side view examples of a curved encoded data pattern 126 in close proximity to a touchscreen 16. In addition to the distance measurements 130 taken from the touchscreen 16 surface to the detected orientation markers 122 based on the effect of the material detected, in FIG. 27, distance measurements 132 from orientation marker 122 to orientation marker 122 are calculated.

The distance measurement 132s from orientation marker 122 to orientation marker 122 are used along with the distance measurements 130 taken from the touchscreen 16 surface to the detected orientation marker 122 to provide more information as to how the encoded data pattern is curved.

The top example shows a gradually curved encoded data pattern 126 and the bottom example shows a severely curved encoded data pattern 126. In the top example, the distance measurements 132 are greater than the distance measurements 132 in the bottom example. These additional data points assist in generating an accurate depiction of the curved encoded data pattern 126.

Figure 28:
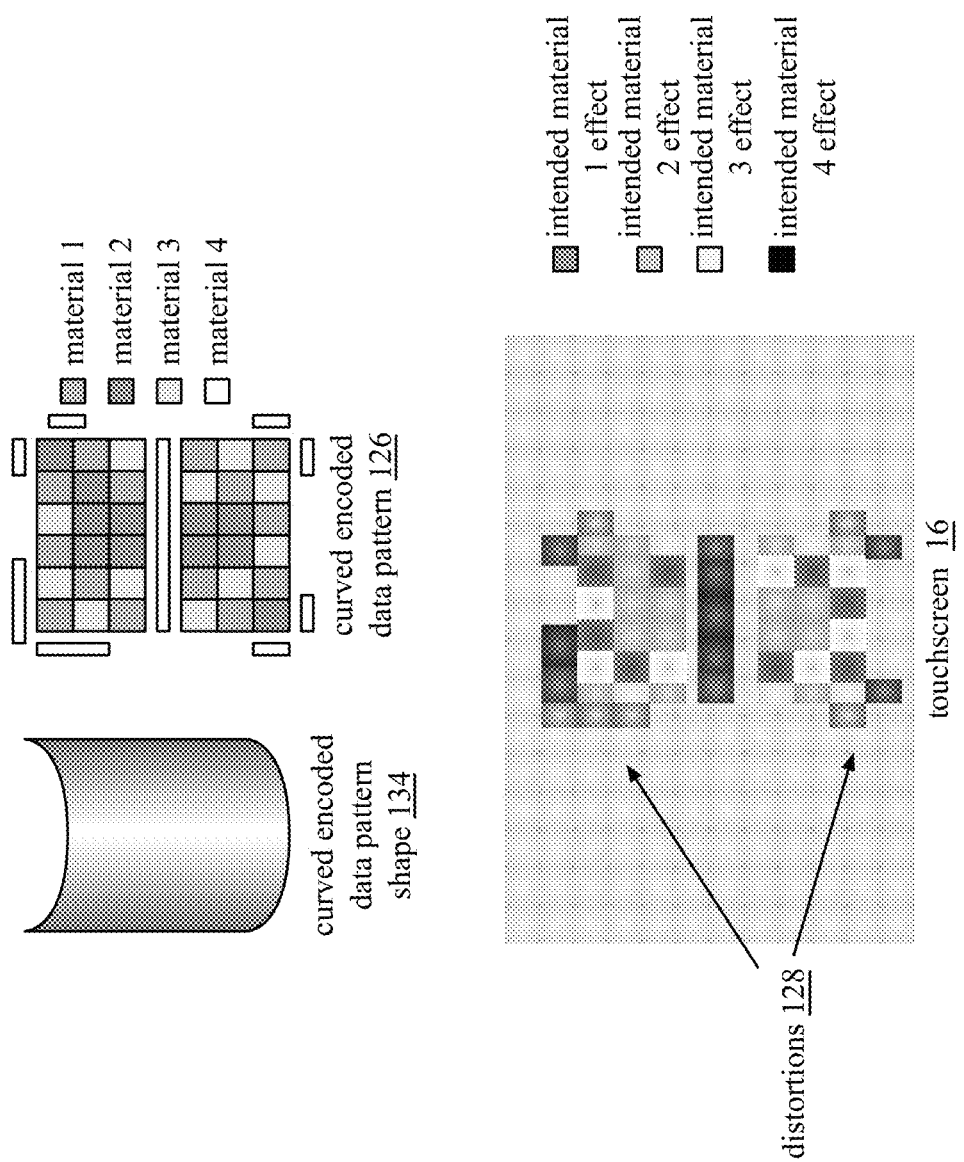
FIG. 28 is a schematic block diagram of an embodiment of a touchscreen in close proximity to a curved encoded data pattern in accordance with the present invention.

FIG. 28 is a schematic block diagram of an embodiment of a touchscreen 16 in close proximity to a curved encoded data pattern 126 consisting of four electrical materials. In comparison to FIG. 25A, the curved encoded data pattern 126 contains additional orientation markers in the center and corners of the encoded data pattern. The curved encoded data pattern 126 has a curved encoded data pattern shape 134 that is curved away from the touchscreen 16 at the left and right edges such that the center portion of the curved encoded data pattern 126 is in closer proximity to the touchscreen 16 than the left and right edges.

With the left and right edges curved away from the touchscreen 16, the intended effect of the electrical materials on the electrical characteristics of the electrodes of the touchscreen 16 is distorted. For example, the effect of material 4 used in the orientation markers is weaker at the left and right edges and has an actual effect closer to the intended effect of material 1 or 2. The effect of material 1 at the left and right edges is weaker and appears closer to the intended effect of material 2. Additionally, because of the curved shape, the outer edges are affecting less area of the touchscreen than if the encoded data pattern was flat. The distortions 128 caused by the curved encoded data pattern 126 could result in encoded data pattern reading errors.

Figure 29:
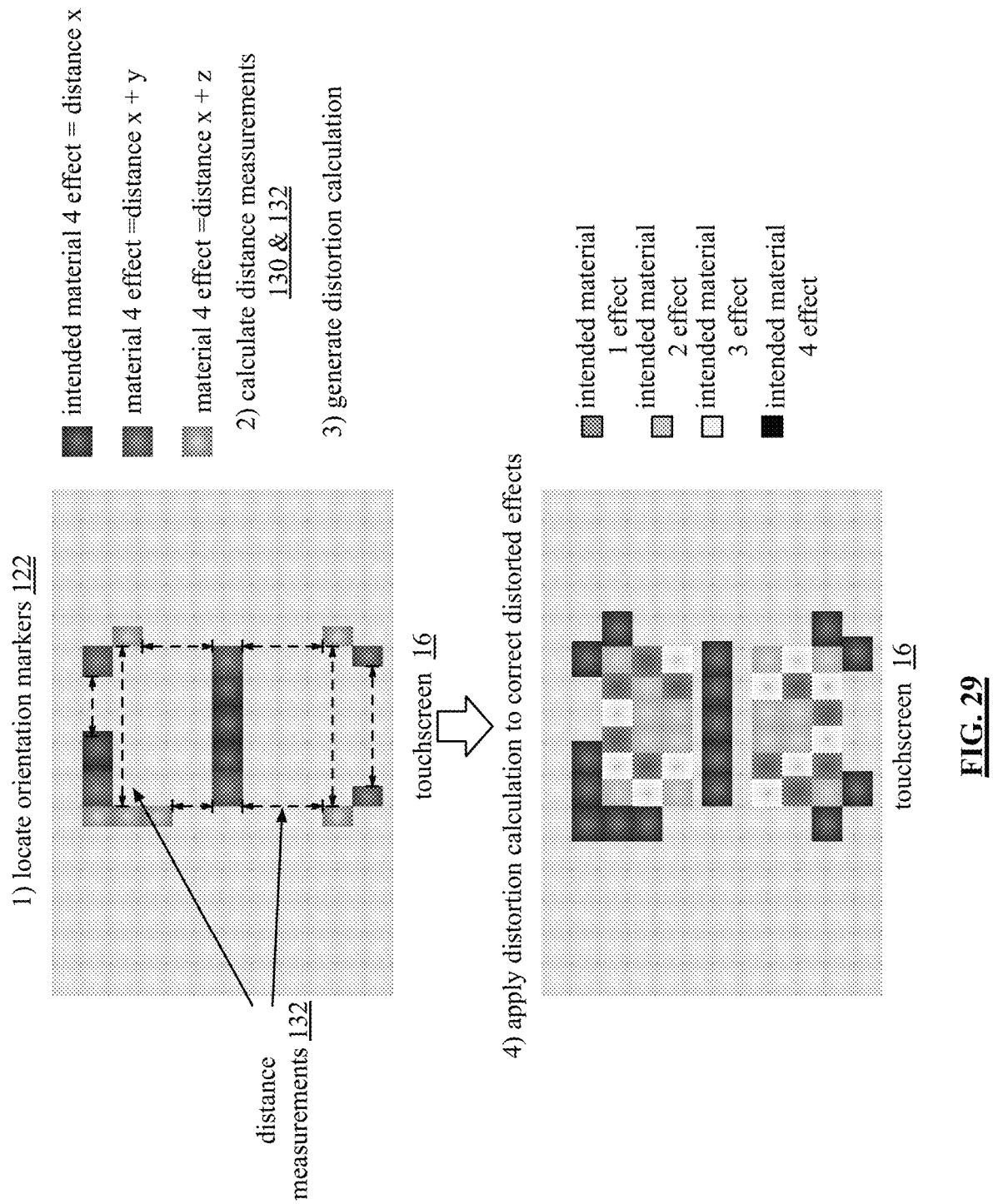
FIG. 29 is a schematic block diagram of an example of correcting distortions caused by a curved encoded data pattern in close proximity to a touchscreen in accordance with the present invention.

FIG. 29 is a schematic block diagram of an example of correcting distortions caused by a curved encoded data pattern 126 in close proximity to a touchscreen 16. FIG. 29 continues the example of FIG. 28 where the curved encoded data pattern 126 consisting of four electrical materials is in close proximity to the touchscreen 16. In a first step, the touchscreen 16 determines the location of the orientation markers 122. For example, the size, shape, and/or location of the orientation markers 122 are distinct for a particular encoded data pattern such that their presence can be determined even if the electrical material effect of the orientation markers is altered by the curved shape.

The intended effect of the orientation marker electrical material is known or provided to the touchscreen 16 for reference. For example, all orientation markers are created using the same electrical material regardless of the encoded data pattern and the intended effect of that material is stored by the touchscreen 16 as a reference. When the orientation markers 122 are located, the touchscreen 16 compares the effects of the orientation marker electrical material on the touchscreen to calculate distance measurements 130. Areas where the intended effect is detected are considered to be a distance "x" from the touchscreen 16 (e.g., a close range of a few millimeters).

Areas with effects slightly weaker than the intended effect are considered to be at a distance "x+y" from the touchscreen 16 (e.g., a distance range further away from the distance "x"). Areas with effects substantially weaker than the intended effect, are considered to be at a distance "x+z" from the touchscreen 16 (e.g., a distance range further away from the distance "x+y"). The touchscreen 16 also calculates distance measurements 132 based on the distance between the orientation markers. The correct amount of distance between the orientation markers is known. Because of the distortion at the edges caused by the curved encoded data pattern, the distance measurements 132 will show that the left and right orientation markers are closer to each other than they should be.

Based on the distance measurements 130 and 132, the touchscreen generates a distortion calculation for correcting the distorted detected effects of the curved encoded data pattern. For example, the touchscreen 16 now knows that the edges of the detected encoded data pattern are curved away from the surface of the touchscreen 16. Therefore, the calculation widens and enhances the detected effects in distorted areas in order to recreate a flat version of the curved encoded data pattern and extract the correct data.

Other embodiments for reading a curved encoded data pattern may include the use of a handheld encoded data pattern touchscreen sensing computing device where a user moves the handheld encoded data pattern touchscreen sensing computing device over the curved encoded data pattern such that the touchscreen is in close proximity to the curved encoded data pattern at different times but at the same distance.

In another embodiment, the encoded data pattern touchscreen sensing computing device is a fixed device where a user moves the curved encoded data pattern over the touchscreen such that the touchscreen is in close proximity to the curved encoded data pattern at different times but at the same distance.

In another embodiment, the data encoded in the encoded data pattern includes redundancy information such that if a certain amount of the encoded data pattern is unreadable (e.g., curved out of view, destroyed, etc.), the data can still be read accurately.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, touchscreen errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An encoded data pattern touchscreen sensing system comprises:
    an encoded data pattern including:
        one or more electrical materials arranged in a pattern, wherein the electrical properties of the one or more electrical materials and the pattern are representative of data; and
    an encoded data pattern touchscreen sensing computing device for interpreting the data of the encoded data pattern including:
        a touchscreen;
        a plurality of electrodes integrated into the touchscreen;
        a plurality of drive-sense circuits coupled to the plurality of electrodes, wherein, when enabled and in close proximity to the encoded data pattern, the plurality of drive-sense circuits detect changes in electrical characteristics of the plurality of electrodes caused by the one or more electrical materials of the encoded data pattern; and
        a processing module operably coupled to:
            receive, from a set of drive-sense circuits of the plurality of drive-sense circuits, a set of detected changes in electrical characteristics of the set of drive-sense circuits;
            interpret the detected changes in electrical characteristics as a set of impedance values representative of the one or more electrical materials of the encoded data pattern; and
            interpret the set of impedance values to determine the data.

2. The encoded data pattern touchscreen sensing system of claim 1 further comprises:
    a communication module operably coupled to communicate one or more of:
        the set of detected changes in electrical characteristics of the set of drive-sense circuits;
        the set of impedance values representative of the one or more electrical materials of the encoded data pattern; and
        the data.

3. The encoded data pattern touchscreen sensing system of claim 1, wherein the encoded data pattern comprises:
    one or more orientation markers; and
    a plurality of cells, wherein a cell of the plurality of cells includes a symbol representative of data.

4. The encoded data pattern touchscreen sensing system of claim 1, wherein the data comprises one or more of:
    text data; and
    image data.

5. The encoded data pattern touchscreen sensing system of claim 1, wherein the electrical properties of the one or more electrical materials comprises one or more of:
    conductivity;
    resistivity;
    temperature coefficient of resistance;
    dielectric strength;
    permittivity;
    thermoelectricity; and
    permeability.

6. The encoded data pattern touchscreen sensing system of claim 1, wherein the touchscreen includes:
    a display operable to render frames of data into visible images; and
    a video graphics processing module operably coupled to generate the frames of data.

7. The encoded data pattern touchscreen sensing system of claim 1, wherein the processing module is operable to interpret the set of changes in electrical characteristics as the set of impedance values by:
- receiving, from the set of drive-sense circuits, the set of changes in electrical characteristics from the set of electrodes;
- filtering the set of changes in electrical characteristics in accordance with a set of bandpass frequency ranges to produce a set of filtered signals; and
- interpreting the set of filtered signals to identify the set of impedance values representative of the one or more electrical materials of the encoded data pattern.

8. An encoded data pattern touchscreen sensing system comprises:
- an encoded data pattern for touchscreen sensing including:
  - one or more electrical materials arranged in a pattern, wherein the electrical properties of the one or more electrical materials and the pattern are representative of data; and
- an encoded data pattern touchscreen sensing computing device including:
  - a touchscreen;
  - a plurality of electrodes integrated into the touchscreen;
  - a plurality of drive-sense circuits coupled to the plurality of electrodes, wherein, when enabled and in close proximity to the encoded data pattern for touchscreen sensing, the plurality of drive-sense circuits detect changes in electrical characteristics of the plurality of electrodes caused by the one or more electrical materials of the encoded data pattern; and
  - a communication module operably coupled to communicate the electrical characteristics of the plurality of electrodes caused by the one or more electrical materials of the encoded data pattern.

9. The encoded data pattern touchscreen sensing system of claim 8 further comprises:
- a processing module operably coupled to:
  - receive, from a set of drive-sense circuits of the plurality of drive-sense circuits, a set of detected changes in electrical characteristics of the set of drive-sense circuits;
  - interpret the detected changes in electrical characteristics as a set of impedance values representative of the one or more electrical materials of the encoded data pattern; and
  - interpret the set of impedance values to determine the data.

10. The encoded data pattern touchscreen sensing system of claim 9, wherein the processing module is operable to interpret the set of changes in electrical characteristics as the set of impedance values by:
- receiving, from the set of drive-sense circuits, the set of changes in electrical characteristics from the set of electrodes;
- filtering the set of changes in electrical characteristics in accordance with a set of bandpass frequency ranges to produce a set of filtered signals; and
- interpreting the set of filtered signals to identify the set of impedance values representative of the one or more electrical materials of the encoded data pattern.

11. The encoded data pattern touchscreen sensing system of claim 8, wherein the encoded data pattern comprises:
- one or more orientation markers; and
- a plurality of cells, wherein a cell of the plurality of cells includes a symbol representative of data.

12. The encoded data pattern touchscreen sensing system of claim 8, wherein the data comprises one or more of:
- text data; and
- image data.

13. The encoded data pattern touchscreen sensing system of claim 8, wherein the electrical properties of the one or more electrical materials comprises one or more of:
- conductivity;
- resistivity;
- temperature coefficient of resistance;
- dielectric strength;
- permittivity;
- thermoelectricity; and
- permeability.

14. The encoded data pattern touchscreen sensing system of claim 8, wherein the touchscreen includes:
- a display operable to render frames of data into visible images; and
- a video graphics processing module operably coupled to generate the frames of data.

\* \* \* \* \*